United States Patent
Lee et al.

(10) Patent No.: US 10,291,275 B2
(45) Date of Patent: May 14, 2019

(54) RECEPTION INTERFACE CIRCUITS SUPPORTING MULTIPLE COMMUNICATION STANDARDS AND MEMORY SYSTEMS INCLUDING THE SAME

(71) Applicant: Samsung Electronics Co., Ltd., Suwon-si, Gyeonggi-do (KR)

(72) Inventors: Seon-Kyoo Lee, Hwaseong-si (KR); Byung-Hoon Jeong, Hwaseong-si (KR); Jeong-Don Ihm, Seongnam-si (KR); Young-Don Choi, Seoul (KR)

(73) Assignee: Samsung Electronics Co., LTD., Gyeonggi-Do (KR)

( * ) Notice: Subject to any disclaimer, the term of this patent is extended or adjusted under 35 U.S.C. 154(b) by 207 days.

(21) Appl. No.: 15/397,012

(22) Filed: Jan. 3, 2017

(65) Prior Publication Data

US 2017/0288717 A1   Oct. 5, 2017

(30) Foreign Application Priority Data

Mar. 31, 2016 (KR) ........................ 10-2016-0039120

(51) Int. Cl.
*H03F 1/32* (2006.01)
*H03F 1/34* (2006.01)
(Continued)

(52) U.S. Cl.
CPC ........... *H04B 1/24* (2013.01); *H04L 25/0292* (2013.01); *H04L 25/0298* (2013.01);
(Continued)

(58) Field of Classification Search
CPC .. H03F 2203/45036; H03F 1/30–1/301; H03F 1/3211; H03F 1/3217; H03K 19/0005
(Continued)

(56) References Cited

U.S. PATENT DOCUMENTS 5,416,744 A * 5/1995 Flannagan ............... G11C 7/12
   365/177
5,761,244 A * 6/1998 Hedberg ........ H03K 19/018571
   326/86
(Continued)

FOREIGN PATENT DOCUMENTS

JP         5262706 B2    8/2013
KR  10-2007-0096151 A  10/2007

*Primary Examiner* — James M Perez
(74) *Attorney, Agent, or Firm* — Harness, Dickey & Pierce, P.L.C.

(57) ABSTRACT

A reception interface circuit includes a termination circuit, a buffer and an interface controller. The termination circuit is configured to change a termination mode in response to a termination control signal. The buffer is configured to change a reception characteristic in response to a buffer control signal. The interface controller is configured to generate the termination control signal and the buffer control signal such that the reception characteristic of the buffer is changed in association with the change in the termination mode. The reception interface circuit may support various communication standards by changing the reception characteristic of the buffer in association with the termination mode. Using the reception interface circuit, communication efficiency of transceiver systems such as a memory system and/or compatibility between a transmitter device and a receiver device may be improved.

18 Claims, 26 Drawing Sheets

(51) Int. Cl.
*H04B 1/24* (2006.01)
*H04L 25/03* (2006.01)
*H04L 12/863* (2013.01)
*H04L 25/02* (2006.01)
*H04L 12/861* (2013.01)

(52) U.S. Cl.
CPC .. *H04L 25/03847* (2013.01); *H04L 25/03878* (2013.01); *H04L 47/6235* (2013.01); *H04L 49/90* (2013.01)

(58) Field of Classification Search
USPC .............. 375/219–220, 229–236, 316–352
See application file for complete search history.

(56) References Cited

U.S. PATENT DOCUMENTS

| | | | | |
|---|---|---|---|---|
| 6,020,761 | A * | 2/2000 | Hwang | H03K 19/018528 326/70 |
| 6,081,468 | A * | 6/2000 | Taira | G11C 7/12 365/203 |
| 6,104,653 | A * | 8/2000 | Proebsting | G11C 7/065 257/E21.659 |
| 6,163,475 | A * | 12/2000 | Proebsting | G11C 7/065 257/E21.659 |
| 6,198,682 | B1 * | 3/2001 | Proebsting | G11C 7/065 257/E21.659 |
| 6,208,575 | B1 * | 3/2001 | Proebsting | G11C 7/065 257/E21.659 |
| 6,212,109 | B1 * | 4/2001 | Proebsting | G11C 7/065 257/E21.659 |
| 6,240,046 | B1 * | 5/2001 | Proebsting | G11C 7/065 257/E21.659 |
| 6,282,135 | B1 * | 8/2001 | Proebsting | G11C 7/065 257/E21.659 |
| 6,356,485 | B1 * | 3/2002 | Proebsting | G11C 7/065 365/189.16 |
| 6,392,619 | B1 * | 5/2002 | Nitta | G09G 3/3611 345/1.2 |
| 6,437,713 | B1 * | 8/2002 | Lesea | H03K 5/1502 326/41 |
| 6,462,584 | B1 * | 10/2002 | Proebsting | G11C 7/065 257/E21.659 |
| 7,038,498 | B2 * | 5/2006 | Funaba | H03K 19/018592 326/30 |
| 7,570,714 | B2 * | 8/2009 | Hori | H03K 5/086 327/65 |
| 7,586,987 | B2 * | 9/2009 | Vorenkamp | H04B 3/144 375/257 |
| 7,683,720 | B1 * | 3/2010 | Yehui | H03F 3/45192 30/252 |
| 7,822,111 | B2 * | 10/2010 | Sohn | H04L 25/03038 375/231 |
| 8,050,084 | B2 * | 11/2011 | Bae | G11C 7/04 365/163 |
| 8,050,332 | B2 * | 11/2011 | Chung | H04L 25/0264 375/244 |
| 8,446,988 | B2 * | 5/2013 | Chung | H04L 25/0264 375/340 |
| 8,675,714 | B2 * | 3/2014 | Cheung | H04L 25/03885 375/214 |
| 8,923,065 | B2 * | 12/2014 | Ramachandra | G11C 16/06 365/185.2 |
| 8,937,490 | B2 * | 1/2015 | Moon | H03K 19/018521 326/27 |
| 8,952,719 | B2 * | 2/2015 | Komyo | H03K 19/0005 326/30 |
| 8,983,407 | B2 * | 3/2015 | Southcombe | H03F 1/30 455/114.2 |
| 8,988,101 | B2 * | 3/2015 | Song | G11C 7/1057 326/30 |
| 9,088,445 | B2 * | 7/2015 | Chun | G06F 13/4086 |
| 9,130,557 | B2 * | 9/2015 | Cho | H03K 19/0005 |
| 9,171,610 | B2 * | 10/2015 | Choi | G11C 11/419 |
| 9,246,716 | B2 | 1/2016 | Chun et al. | |
| 9,330,743 | B2 * | 5/2016 | Kim | G11C 11/1673 |
| 9,432,018 | B2 * | 8/2016 | Park | H03K 19/0013 |
| 9,544,864 | B1 * | 1/2017 | Takahashi | H04W 56/0015 |
| 9,575,923 | B2 * | 2/2017 | Cho | H03K 19/0005 |
| 9,595,315 | B2 * | 3/2017 | Han | G11C 11/4091 |
| 9,602,317 | B1 * | 3/2017 | Hailu | H04L 25/03885 |
| 9,654,310 | B1 * | 5/2017 | Chang | H04L 25/03025 |
| 9,722,820 | B1 * | 8/2017 | Hekmat | H04L 25/03146 |
| 9,787,505 | B2 * | 10/2017 | Lim | H04L 25/03057 |
| 9,831,864 | B2 * | 11/2017 | Thiagarajan | H03H 19/004 |
| 9,934,169 | B2 * | 4/2018 | Cho | H03K 19/0005 |
| 10,014,039 | B2 * | 7/2018 | Lee | G11C 29/028 |
| 2006/0038577 | A1 * | 2/2006 | Jang | G11C 5/147 327/538 |
| 2006/0171477 | A1 * | 8/2006 | Carballo | H04L 25/0272 375/257 |
| 2008/0250293 | A1 * | 10/2008 | Taori | H04L 1/0082 714/748 |
| 2009/0052261 | A1 * | 2/2009 | Koo | G06F 13/4239 365/189.07 |
| 2011/0242916 | A1 * | 10/2011 | Seol | G11O 5/063 365/198 |
| 2011/0309475 | A1 * | 12/2011 | Lee | G11C 5/025 257/532 |
| 2012/0052825 | A1 * | 3/2012 | Southcombe | H03F 1/30 455/127.2 |
| 2012/0113733 | A1 * | 5/2012 | Kim | G11C 5/063 365/193 |
| 2013/0069689 | A1 * | 3/2013 | Song | G11C 7/1057 326/30 |
| 2014/0152340 | A1 * | 6/2014 | Cho | H03K 19/0005 326/30 |
| 2015/0063007 | A1 * | 3/2015 | Choi | G11C 11/419 365/154 |
| 2016/0254932 | A1 * | 9/2016 | Chong | H04L 25/03019 375/233 |
| 2017/0110197 | A1 * | 4/2017 | Park | G11C 16/28 |
| 2017/0139848 | A1 * | 5/2017 | Cho | H03K 19/0005 |
| 2017/0222649 | A1 * | 8/2017 | Koo | H03K 19/017518 |
| 2017/0287535 | A1 * | 10/2017 | Lee | G11C 29/028 |
| 2017/0316833 | A1 * | 11/2017 | Ihm | G11C 16/28 |
| 2018/0004281 | A1 * | 1/2018 | Kang | G06F 1/3287 |
| 2018/0315461 | A1 * | 11/2018 | Lee | G11C 29/028 |

* cited by examiner

FIG. 4

| TMD | TP | TN | BUFFER |
|---|---|---|---|
| CTT | ON | ON | BF1 |
| UNT | OFF | OFF | BF2 |
| POD_N | OFF | ON | BF3 |
| POD_P | ON | OFF | BF4 |

| TPEN | TNEN | GP | GN | TYPE |
|---|---|---|---|---|
| L | L | ST | ST | DRIVER |
| H | H | L | H | CTT |
| L | H | H | H | POD_N |
| H | L | L | L | POD_P |

RECEPTION INTERFACE CIRCUITS SUPPORTING MULTIPLE COMMUNICATION STANDARDS AND MEMORY SYSTEMS INCLUDING THE SAME

CROSS-REFERENCE TO RELATED APPLICATION

This non-provisional U.S. patent application claims priority under 35 USC § 119 to Korean Patent Application No. 10-2016-0039120, filed on Mar. 31, 2016, in the Korean Intellectual Property Office (KIPO), the entire contents of which are incorporated herein by reference.

BACKGROUND

Technical Field

Example embodiments relate generally to semiconductor integrated circuits, for example, reception interface circuits configured to support multiple communication standards and/or memory systems including reception interface circuits.

Discussion of Related Art

A related art transceiver device includes an interface circuit for receiving and transmitting signals. As an operating speed of a semiconductor integrated circuit increases, a frequency of transferred signals increases and a swing width of the transferred signals decreases for reducing power consumption. Because of the increased frequency and the decreased swing width of the transferred signals, even relatively small noise may degrade performance. According to development of semiconductor manufacturing processes, various communication standards are being suggested with respect to input-output interfaces. When the input-output interface of the receiver device is not compatible with the input-output interface of the transmitter device, establishment of the transceiver system may be relatively difficult and/or impossible and, if possible, communication efficiency may be degraded.

SUMMARY

At least one example embodiment may provide a reception interface circuit capable of supporting multiple communication standards.

At least one example embodiment may provide a memory system including a reception interface circuit capable of supporting multiple communication standards.

According to at least one example embodiment, a reception interface circuit includes a termination circuit, a buffer and an interface controller. The termination circuit is configured to change a termination mode in response to a termination control signal. The buffer is configured to change a reception characteristic in response to a buffer control signal. The interface controller is configured to generate the termination control signal and the buffer control signal such that the reception characteristic of the buffer is changed in association with the change in the termination mode.

According to at least one example embodiment, a memory system includes a memory device and a memory controller configured to control the memory device. The memory device includes: a termination circuit, a buffer and an interface controller. The termination circuit is configured to change a termination mode in response to a termination control signal. The buffer is configured to change a reception characteristic in response to a buffer control signal. The interface controller is configured to generate the termination control signal and the buffer control signal such that the reception characteristic of the buffer is changed in association with the change in the termination mode.

According to at least one example embodiment, a memory device includes a reception interface circuit. The reception interface circuit includes a plurality of reception buffers. The reception interface circuit is configured to: operate in a plurality of termination modes based on mode information stored at an internal circuit of the memory device; and set a reception characteristic for the reception interface circuit by selecting a reception buffer from among the plurality of reception buffers based on a selected one of the plurality of termination modes, each of the plurality of reception buffers having different reception characteristics.

Reception interface circuits according to one or more example embodiments may support various communication standards by changing one or more reception characteristics of the buffer block in association with the termination mode. The reception interface circuits may also improve and/or enhance communication efficiency of transceiver systems such as a memory system and/or compatibility between a transmitter device and a receiver device.

BRIEF DESCRIPTION OF THE DRAWINGS

Example embodiments of the present disclosure will be more clearly understood from the following detailed description taken in conjunction with the accompanying drawings.

FIG. 4 is a diagram illustrating example operation of an interface controller included in the reception interface circuit of FIG. 3.

DETAILED DESCRIPTION

Figure 1:
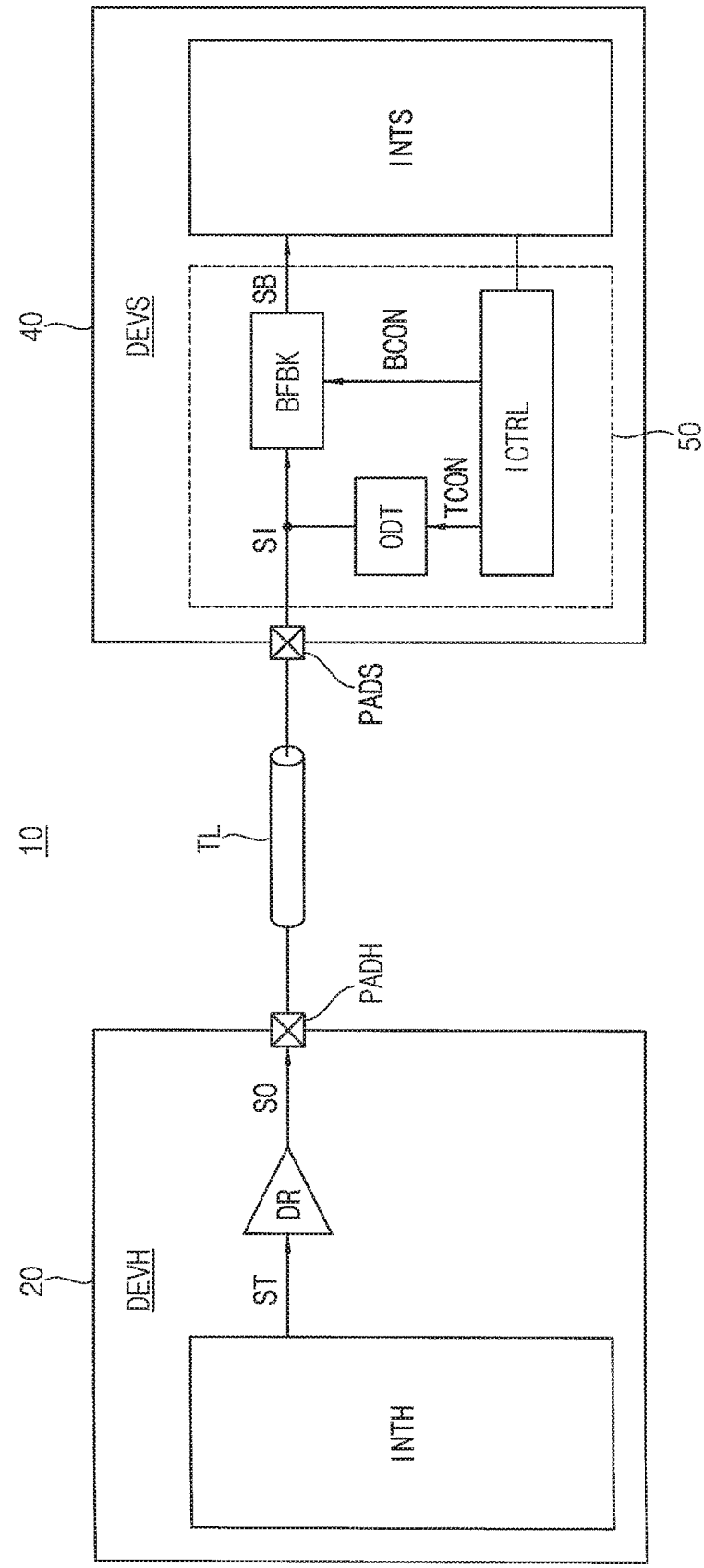
FIG. 1 is a block diagram illustrating a system including a reception interface circuit according to example embodiments.

Various example embodiments will be described more fully hereinafter with reference to the accompanying drawings, in which some example embodiments are shown. In the drawings, like numerals refer to like elements throughout. The repeated descriptions may be omitted.

Figure 2:
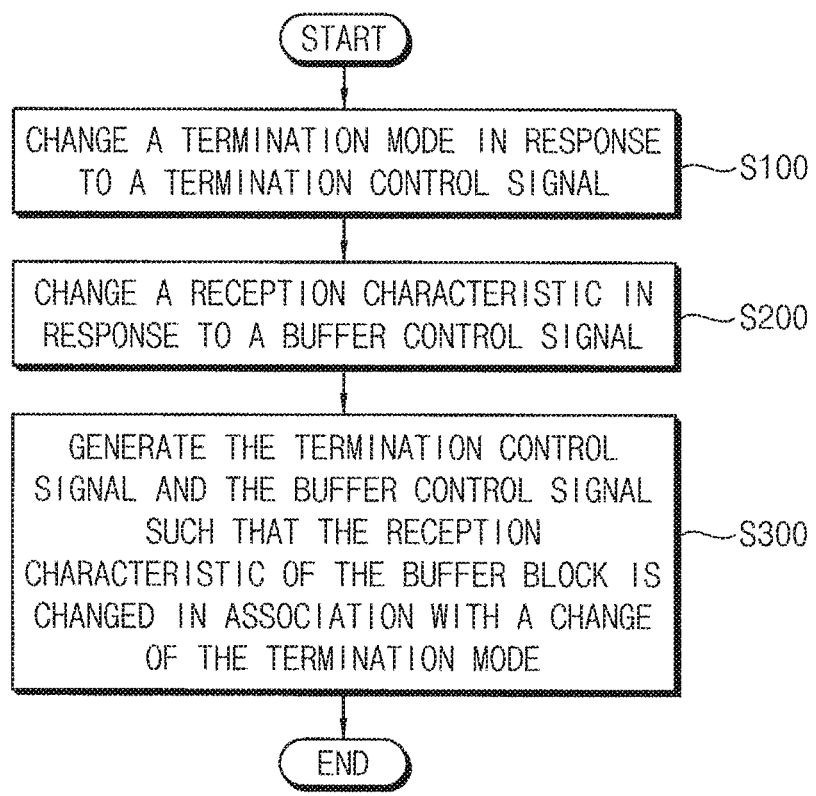
FIG. 2 is a flow chart illustrating a method of controlling a reception interface circuit according to example embodiments.

FIG. 1 is a block diagram illustrating a system including a reception interface circuit according to example embodiments, and FIG. 2 is a flow chart illustrating a method of controlling a reception interface circuit according to example embodiments.

Referring to FIG. 1, a system 10 includes a first device DEVH 20, a second device DEVS 40 and a transmission line TL connecting the first device 20 and the second device 40. For example, the first device 20 may be a memory controller and the second device 40 may be a memory device. FIG. 1 illustrates only components for unidirectional communication for convenience of illustration such that the first device 20 functions as a transmitter and the second device 40 functions as a receiver, but each of the first device 20 and the second device 40 may perform bidirectional communication. Even though a pair of input-output pads PADH and PADS and the one transmission line TL connecting the input-output pads PADH and PADS are illustrated in FIG. 1 for convenience of illustration, each of the first device 20 and the second device 40 may include a plurality of input-output pads and a plurality of transmission lines connecting the input-output pads.

A transmission driver DR in the first device 20 may output an output signal SO to the input-output pad PADH based on a transmission signal ST from an internal circuit INTH. A reception interface circuit 50 in the second device 40 may receive an input signal SI through the input-output pad PADS to provide a buffer signal SB to an internal circuit INTS.

As illustrated in FIG. 1, the reception interface circuit 50 may include a termination circuit ODT, a buffer block BFBK and an interface controller ICTRL. The reception interface circuit may have a configuration for single-ended signaling or pseudo-differential signaling. In fully-differential signaling, the transmitter transmits a transmission signal and its inversion signal, and the receiver compares the two signals for determining a logic high level or a logic low level of the transmission signal. In contrast, in pseudo-differential signaling, the transmitter transmits only the transmission signal, and the receiver compares the transmission signal with a reference voltage for determining the logic high level or the logic low level of the transmission signal.

Referring to FIGS. 1 and 2, the termination circuit ODT changes a termination mode in response to a termination control signal TCON (S100). The buffer block BFBK changes a reception characteristic in response to a buffer control signal BCON (S200). The interface controller ICTRL generates the termination control signal TCON and the buffer control signal BCON such that the reception characteristic of the buffer block BFBK may be changed in association with a change of the termination mode (S300).

The buffer block BFBK may be implemented with various methods. In some example embodiments, as will be described below with reference to FIG. 3, the buffer block BFBK may include a plurality of reception buffers having different reception characteristics and the reception characteristic of the buffer block BFBK may be changed by selecting one of the reception buffers. In other example embodiments, as will be described below with reference to FIG. 7, the reception characteristic of the buffer block BFBK may be changed by changing an operation current of a reception buffer included in the buffer block BFBK.

In some example embodiments, the interface controller ICTRL may generate the termination control signal TCON and the buffer control signal BCON based on a signal provided from the internal circuit INTS of the second device 40. In other example embodiments, the interface controller ICTRL may generate the termination control signal TCON and the buffer control signal BCON based on signals provided from the first device 20.

The interface controller ICTRL may determine the termination mode and the reception characteristic of the buffer block BFBK according to an interface mode. In some example embodiments, the interface mode may be determined based on mode information stored in a mode register set in the internal circuit INTS. For example, when the system 10 of FIG. 1 is a memory system, the mode information may be provided through a mode register write command from the first device 20 (e.g., the memory controller), and the provided mode information may be stored in the mode register set in the second device 40 (e.g., the memory device). Even though the interface controller ICTRL is illustrated as a distinct component in FIG. 1, the interface controller ICTRL may be included in the internal circuit INTS.

As such, the reception interface circuit according to example embodiments may support various communication standards by changing the reception characteristic of the buffer block in association with the termination mode. Using the reception interface circuit, communication efficiency of transceiver systems such as a memory system and/or compatibility between a transmitter device and a receiver device may be improved and/or enhanced.

Figure 3:
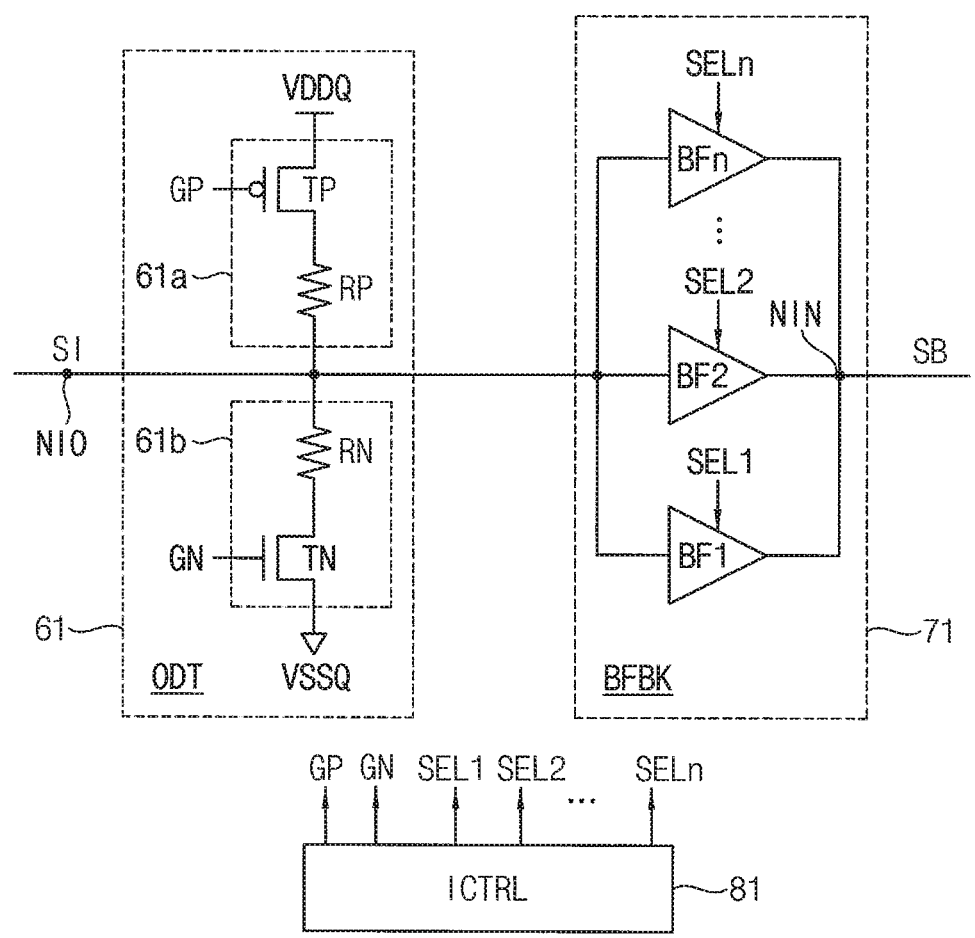
FIG. 3 is a diagram illustrating a reception interface circuit according to example embodiments.

FIG. 3 is a diagram illustrating a reception interface circuit according to example embodiments.

Referring to FIG. 3, a reception interface circuit 51 may include a termination circuit 61, a buffer block 71 and an interface controller ICTRL 81.

The termination circuit 61 may change a termination mode in response to a termination control signal TCON. The termination control signal TCON may include a first switch control signal GP and a second switch control signal GN.

The termination circuit 61 may include a first sub termination circuit 61a and a second sub termination circuit 61b. The first sub termination circuit 61a may control an electrical connection between an input-output node NIO and a first power supply voltage VDDQ in response to a first switch control signal GP. The second sub termination circuit 61b may control an electrical connection between the input-output node NIO and a second power supply voltage VSSQ in response to a second switch control signal GN. The second power supply voltage VSSQ may be lower than the first power supply voltage VDDQ.

The first sub termination circuit 61a may include a first switch and a termination resistor RP. The first switch may be implemented with a P-channel metal oxide semiconductor (PMOS) transistor TP that is turned on in response to a low voltage. The second sub termination circuit 61b may include a second switch and a termination resistor RN. The second switch may be implemented with an N-channel metal oxide semiconductor (NMOS) transistor TN that is turned on in response to a high voltage. The termination resistors RP and RN may be omitted, and each of the termination resistor RP and RN may represent a resistance between each of the voltage nodes and the input-output node NIO when each of the transistors TP and TN is turned on.

The buffer block 71 may change the reception characteristic of itself in response to the buffer control signal BCON. For example, the buffer control signal BCON may include first through n-th buffer selection signals SELL~SELn. The buffer block 71 may buffer the input signal SI received through the input-output node NIO to output a buffer signal SB through an internal node NIN. The buffer block 7218 may include a plurality of reception buffers BF1~BFn that are connected in parallel between the input-output node NIO and the internal node NIN. As will be described below, the reception buffers BF1~BFn may have different reception characteristics. The reception buffers BF1~BFn may be enabled in response to the first through n-th buffer selection signals SELL~SELn, respectively.

The interface controller 81 may generate the first switch control signal GP and the second switch control signal GN as the termination control signal TCON and generate the first through n-th buffer selection signals SELL~SELn as the buffer control signal BCON.

As such, the buffer block 71 may include a plurality of reception buffers BF1~BFn having the different reception characteristics, and the interface controller 81 may control the buffer block 71 such that only one of the reception buffers BF1~BFn may be enabled depending on a change in the termination mode.

FIG. 4 is a diagram illustrating example operation of an interface controller included in the reception interface circuit of FIG. 3.

Referring to FIGS. 3 and 4, the interface controller 81 may determine the termination mode TMD by adjusting logic levels of the first switch control signal GP and the second switch control signal GN.

When the first switch control signal GP is the logic low level and the second switch control signal GN is the logic high level, both of the PMOS transistor TP and the NMOS transistor TN in the termination circuit 61 are turned on and the termination mode TMD may be determined as the center-tapped termination CTT. In this case, the interface controller 81 may activate the first buffer selection signal SEL1 corresponding to the center-tapped termination CTT to select and enable the first buffer BF1 having the reception characteristic suitable for the center-tapped termination CTT.

When the first switch control signal GP is the logic high level and the second switch control signal GN is the logic low level, both of the PMOS transistor TP and the NMOS transistor TN in the termination circuit 61 are turned off and the termination mode TMD may be determined as the untermination UNT. In this case, the interface controller 81 may activate the second buffer selection signal SEL2 corresponding to the untermination UNT to select and enable the second buffer BF2 having the reception characteristic suitable for the untermination UNT.

When the first switch control signal GP is the logic high level and the second switch control signal GN is the logic high level, the PMOS transistor TP in the termination circuit 61 is turned off, the NMOS transistor TN in the termination circuit 61 is turned on, and the termination mode TMD may be determined as the first pseudo-open drain untermination POD_N. In this case, the interface controller 81 may activate the third buffer selection signal SEL3 corresponding to the first pseudo-open drain untermination POD_N to select and enable the third buffer BF3 having the reception characteristic suitable for the first pseudo-open drain untermination POD_N.

When the first switch control signal GP is the logic low level and the second switch control signal GN is the logic low level, the PMOS transistor TP in the termination circuit 61 is turned on, the NMOS transistor TN in the termination circuit 61 is turned off, and the termination mode TMD may be determined as the second pseudo-open drain untermination POD_P. In this case, the interface controller 81 may activate the fourth buffer selection signal SEL4 corresponding to the second pseudo-open drain untermination POD_P to select and enable the fourth buffer BF4 having the reception characteristic suitable for the second pseudo-open drain untermination POD_P.

Hereinafter, termination modes and example embodiments of the corresponding reception buffers are described with respect to FIGS. 5A through 12.

Figure 5A:
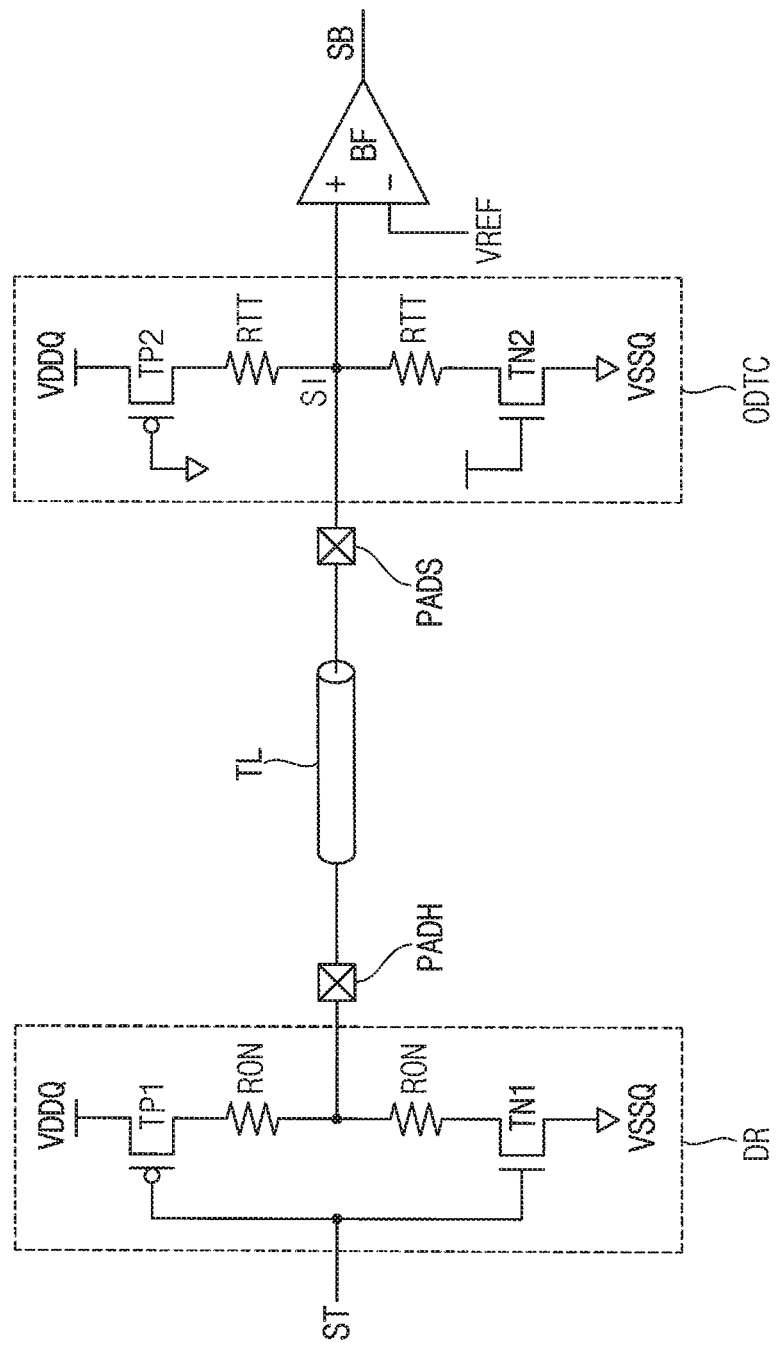
FIGS. 5A and 5B are diagrams for describing center-tapped termination (CTT).
Figure 5B:
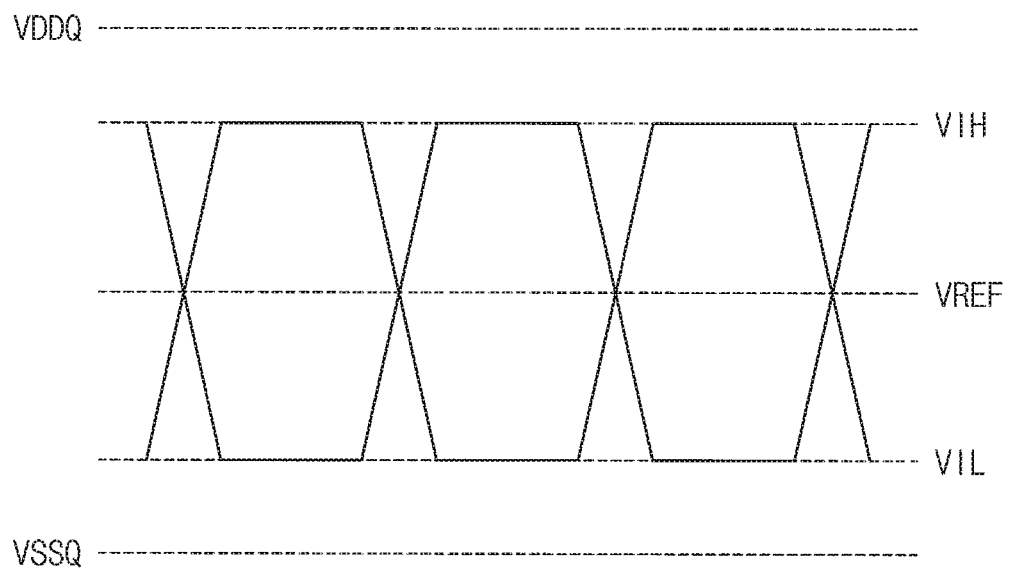

FIGS. 5A and 5B are diagrams for describing center-tapped termination (CTT).

Referring to FIG. 5A, a transmission driver DR in a transmitter device may drive an input-output pad PADH based on a transmission signal ST from an internal signal of the transmitter device. The input-output pad PADH of the transmitter device may be connected to an input-output pad PADS of a receiver device through a transmission line TL. A termination circuit ODTC of the CTT scheme may be connected to the input-output pad PADS of the receiver device for impedance matching. The reception buffer BF in the receiver device may compare the input signal SI through the input-output pad PADS with the reference voltage VREF to provide the buffer signal SB to an internal circuit of the receiver device.

The transmission driver DR may include a pull-up unit connected between a first power supply voltage VDDQ and the input-output pad PADH and a pull-down unit connected between the input-output pad PADH and a second power supply voltage VSSQ. The second power supply voltage VSSQ is lower than the first power supply voltage VDDQ. The pull-up unit may include a turn-on resistor RON and a PMOS transistor TP1 that is switched in response to the transmission signal ST. The pull-down unit may include a turn-on resistor RON and an NMOS transistor TN1 that is switched in response to the transmission signal ST. The turn-on resistors RON may be omitted and each turn-on resistor RON may represent a resistance between the voltage node and the input-output pad PADH when each of the transistors TP1 and TN1 is turned on.

The termination circuit ODTC of the CTT scheme may include a first sub termination circuit connected between the first power supply voltage VDDQ and the input-output pad PADS, and a second sub termination circuit connected between the input-output pad PADS and the second power supply voltage VSSQ. The first sub termination circuit may include a termination resistor RTT and a PMOS transistor TP2 that is turned on in response to a low voltage. The second sub termination circuit may include a termination resistor RTT and an NMOS transistor TN2 that is turned on in response to a high voltage. The termination resistors RTT may be omitted and each termination resistor RTT may represent a resistance between the voltage node and the input-output pad PADS when each of the transistors TP2 and TN2 is turned on.

In case of the termination circuit ODTC of the CTT scheme in FIG. 5A, the high voltage level VIH and the low voltage level VIL of the input signal SI may be represented as shown in FIG. 5B. The second power supply voltage VSSQ may be assumed to be a ground voltage (e.g., VSSQ=0) and the voltage drop along the transmission line TL, etc. may be neglected. Thus, the high voltage level VIH, the low voltage level VIL and the optimal reference voltage VREF may be calculated as shown below in Expression (1).

$$VIH=VDDQ*(RON+RTT)/(2RON+RTT),$$

$$VIL=VDDQ*RON/(2RON+RTT),$$

$$VREF=(VIH+VIL)/2=VDDQ/2 \qquad \text{Expression (1)}$$

Figure 6A:
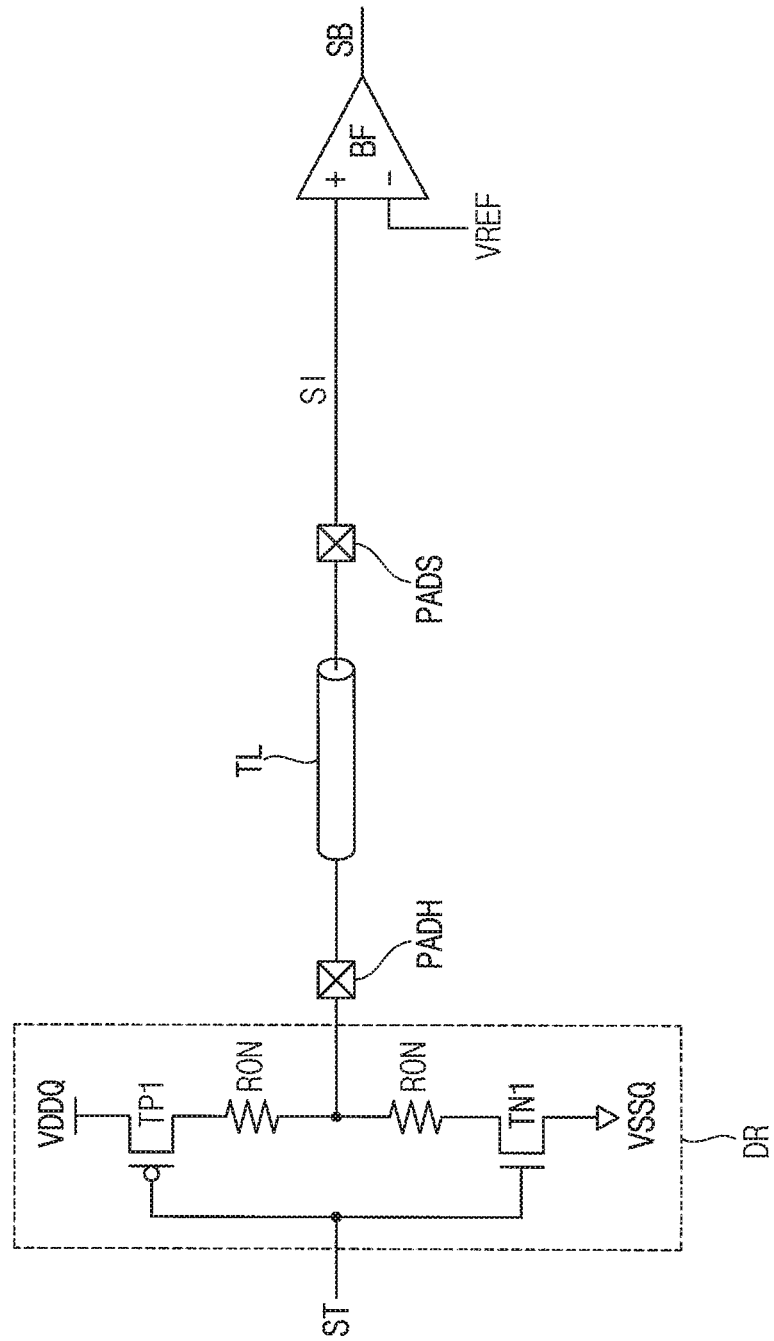
FIGS. 6A and 6B are diagrams for describing untermination.
Figure 6B:
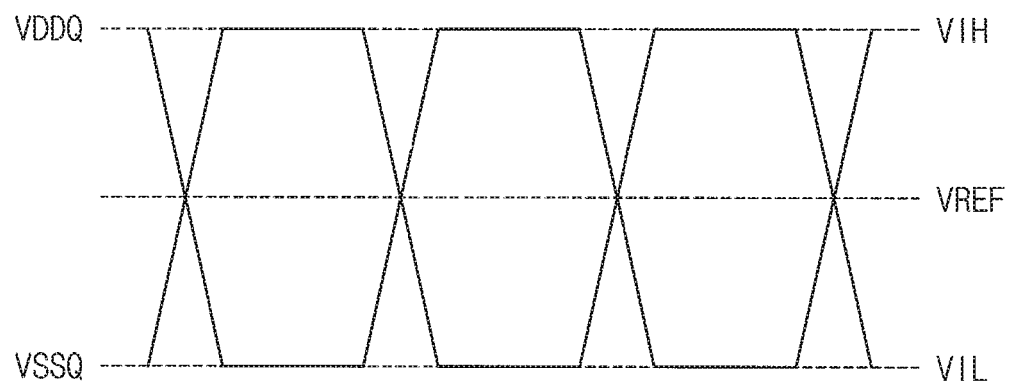

FIGS. 6A and 6B are diagrams for describing an example untermination.

Referring to FIG. 6A, a transmission driver DR in a transmitter device may drive an input-output pad PADH based on a transmission signal ST from an internal signal of the transmitter device. The input-output pad PADH of the transmitter device may be connected to an input-output pad PADS of a receiver device through a transmission line TL. The reception buffer BF in the receiver device may compare the input signal SI through the input-output pad PADS with the reference voltage VREF to provide the buffer signal SB to an internal circuit of the receiver device.

The transmission driver DR may include a pull-up unit connected between a first power supply voltage VDDQ and the input-output pad PADH and a pull-down unit connected between the input-output pad PADH and a second power supply voltage VSSQ lower than the first power supply voltage VDDQ. The pull-up unit may include a turn-on resistor RON and a PMOS transistor TP1 that is switched in response to the transmission signal ST. The pull-down unit may include a turn-on resistor RON and an NMOS transistor TN1 that is switched in response to the transmission signal ST. The turn-on resistors RON may be omitted and each turn-on resistor RON may represent a resistance between the voltage node and the input-output pad PADH when each of the transistors TP1 and TN1 is turned on.

In case of the untermination in FIG. 6A, the high voltage level VIH and the low voltage level VIL of the input signal SI may be represented as shown in FIG. 6B. The second power supply voltage VSSQ may be assumed to be a ground voltage (e.g., VSSQ=0) and the voltage drop along the transmission line TL, etc. may be neglected. Thus, the high voltage level VIH, the low voltage level VIL and the reference voltage (e.g., optimal reference voltage) VREF may be calculated as shown below in Expression (2).

$$VIH=VDDQ,$$

$$VIL=VSS Q=0,$$

$$VREF=(VIH+VIL)/2=VDDQ/2 \qquad \text{Expression (2)}$$

Figure 7:
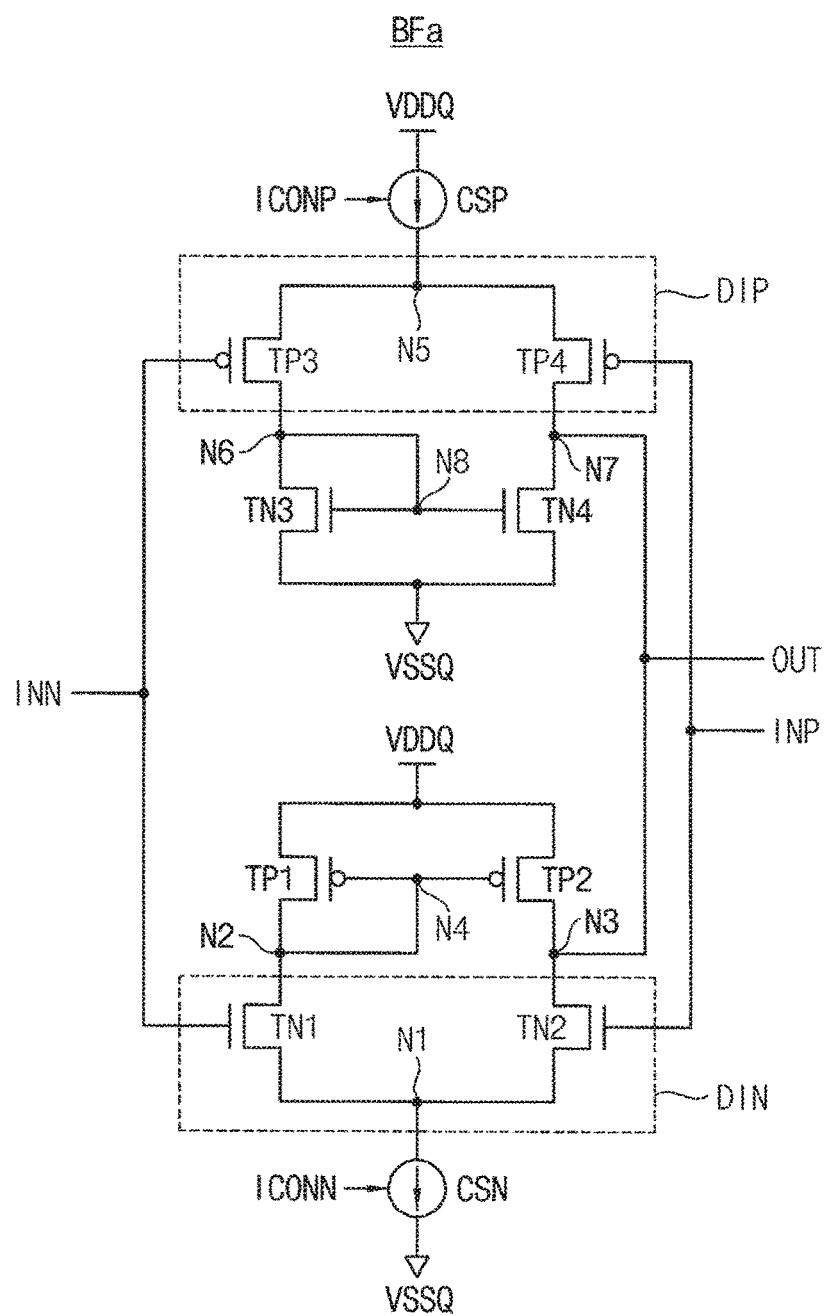
FIGS. 7 and 8 are diagrams illustrating reception buffers compatible with CTT and untermination.
Figure 8:
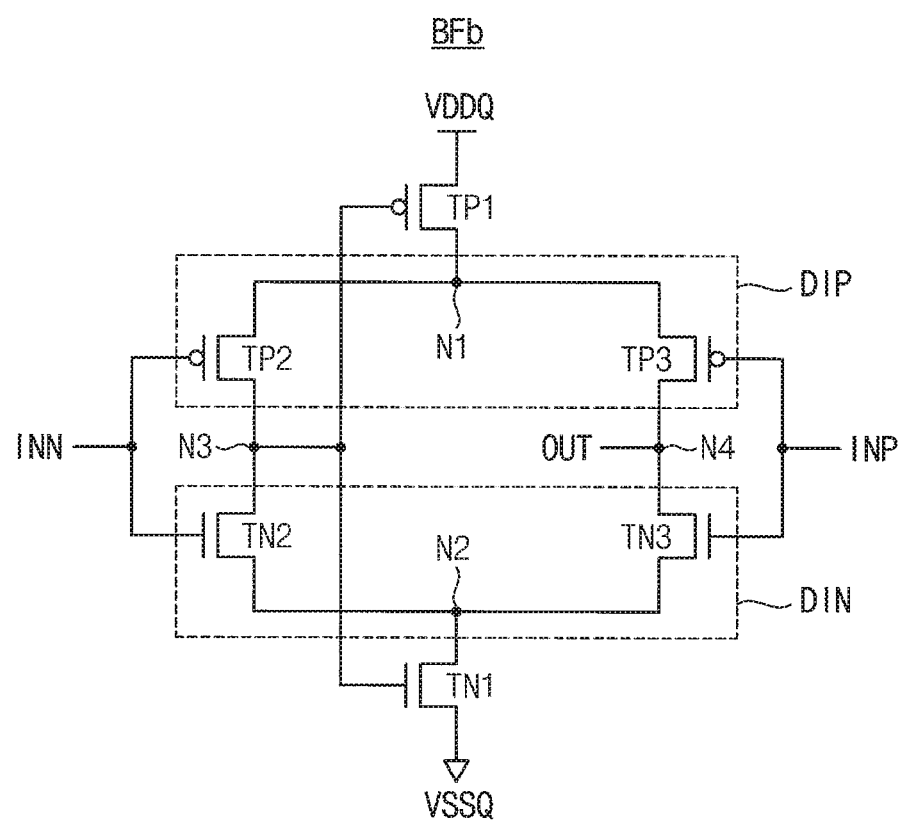

FIGS. 7 and 8 are diagrams illustrating example reception buffers compatible with the CTT and the untermination.

Referring to FIG. 7, a reception buffer BFa may include a first current source CSN, a second current source CSP, an N-type differential input pair DIN of NMOS transistors TN1 and TN2, a P-type differential input pair DIP of PMOS transistors TP3 and TP4, an N-type current mirror of NMOS transistors TN3 and TN4 and a P-type current mirror of the PMOS transistors TP1 and TP2.

The first current source CSN is connected between the second power supply voltage VSSQ and the first node N1. The second current source CSP is connected between the first power supply voltage VDDQ and the fifth node N5.

The N-type differential input pair DIN is connected between the first node N1 and the second and third nodes N2 and N3. The P-type differential input pair DIP is connected between the fifth node N5 and the sixth and seventh nodes N6 and N7. The control terminals of the N-type differential input pair DIN and the P-type differential input pair DIP receive the input signal pair INN and INP. The input signal pair INN and INP may be a differential signal pair, or the single-ended signal and the reference voltage signal.

The third node N3 and the seventh node N7 may be connected electrically to provide the output signal OUT. In other example embodiments, the second node N2 and the sixth node N6 may be connected electrically to provide the output signal.

The N-type current mirror TN3 and TN4 is connected between the second power supply voltage VSSQ and the sixth and seventh nodes N6 and N7, and the sixth node N6 and the eighth node N8 are electrically connected to form a diode-connection structure. The P-type current mirror TP1 and TP2 is connected between the first power supply voltage VDDQ and the second and third nodes N2 and N3, and the second node N2 and the fourth node N4 are electrically connected to form a diode-connection structure.

The reception buffer BFa of FIG. 7 includes both of the N-type differential input pair DIN and the P-type differential input pair DIP. In case of the CTT and the untermination, the average voltage level of the input signal SI is about (VDDQ-VSSQ)/2, which is not too high and not too low. Accordingly the reception buffer BFa, which includes both of an N-type differential amplifier including the N-type differential input pair DIN and a P-type differential amplifier including the P-type differential input pair DIP, is suitable for the cases of the CTT and the untermination.

In some example embodiments, the first current source CSN and the second current source CSP may be omitted. In other example embodiments, the tail currents of the first current source CSN and the second current source CSP may be changed based on current control signals ICONP and ICONN. The current control signals ICONP and ICONN may be included in the above-mentioned buffer control signal BCON. The interface controller ICTRL may control the strengths of the tail currents of the first current source CSN and the second current source CSP through the current control signals ICONP and ICONN. The operation speed of the reception buffer BFa and the integrated circuit including the reception buffer BFa may be increased by increasing the tail currents. As such, the interface controller ICTRL may control the buffer block BFBK such that the operation current of the enabled reception buffer among the reception buffers in the buffer block BFBK may be changed depending on the operation speed of the buffer block BFBK.

Referring to FIG. 8, a reception buffer BFb may include a first NMOS transistor TN1, a first PMOS transistor TP1, an N-type differential input pair DIN of NMOS transistors TN2 and TN3, and a P-type differential input pair DIP of PMOS transistors TP2 and TP3.

The first PMOS transistor TP1 is connected between the first power supply voltage VDDQ and the first node N1. The first NMOS transistor TN1 is connected between the second power supply voltage VSSQ and the second node N2. The first NMOS transistor TN1 and the first PMOS transistor TP1 may function as current sources.

The N-type differential input pair DIN is connected between the second node N2 and the third and fourth nodes N3 and N4. The P-type differential input pair DIP is connected between the first node N1 and the third and fourth nodes N3 and N4. The control terminals of the N-type differential input pair DIN and the P-type differential input pair DIP receive the input signal pair INN and INP. The input signal pair INN and INP may be a differential signal pair, or the single-ended signal and the reference voltage signal.

The control terminals of the first NMOS transistor TN1 and the first PMOS transistor TP1 are connected to the third node N3, and the output signal OUT may be provided through the fourth node N4.

The reception buffer BFb of FIG. 8 includes both of the N-type differential input pair DIN and the P-type differential input pair DIP. In case of the CTT and the untermination, the average voltage level of the input signal SI is about (VDDQ-VSSQ)/2, which is not too high and not too low. Accordingly the reception buffer BFb, which includes both of an N-type differential amplifier including the N-type differential input pair DIN and a P-type differential amplifier including the P-type differential input pair DIP, is suitable for the cases of the CTT and the untermination.

Figure 9A:
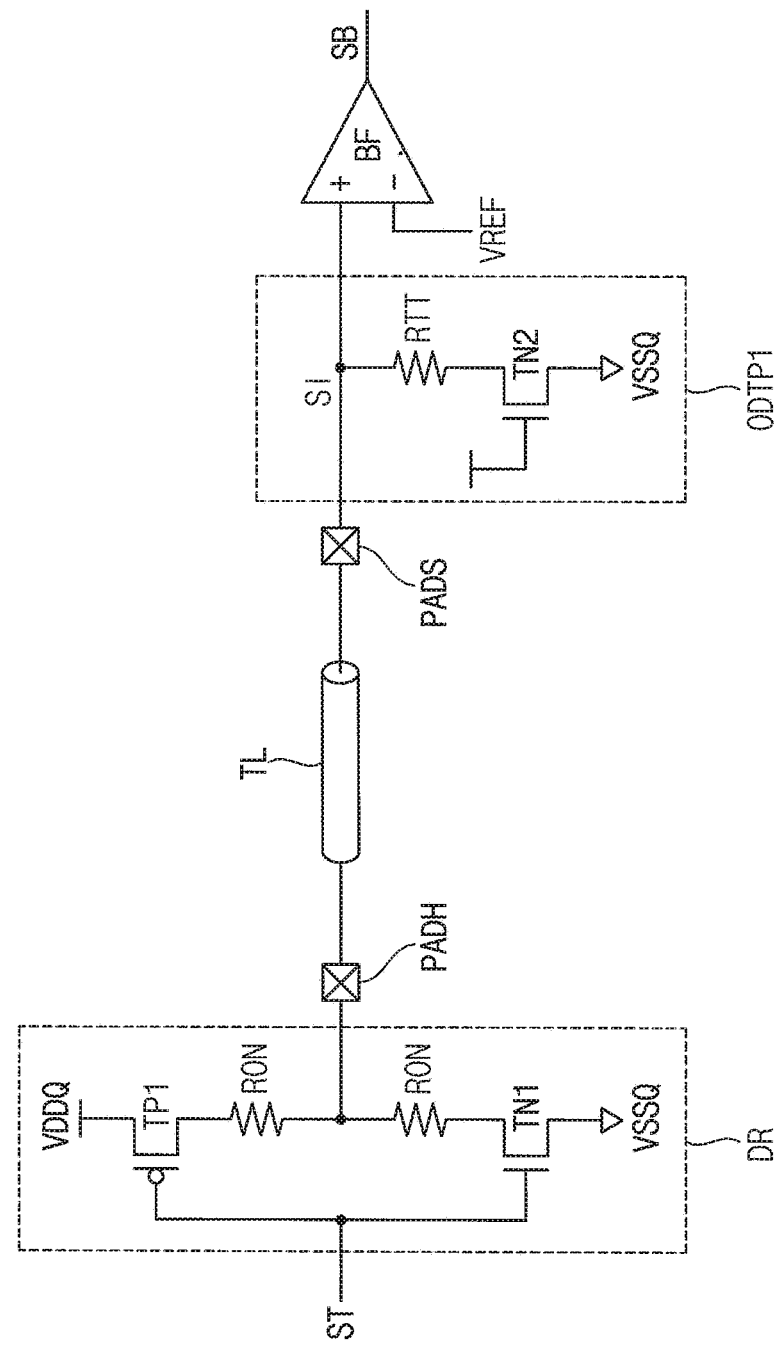
FIGS. 9A and 9B are diagrams for describing a first pseudo-open drain (POD) termination.
Figure 9B:
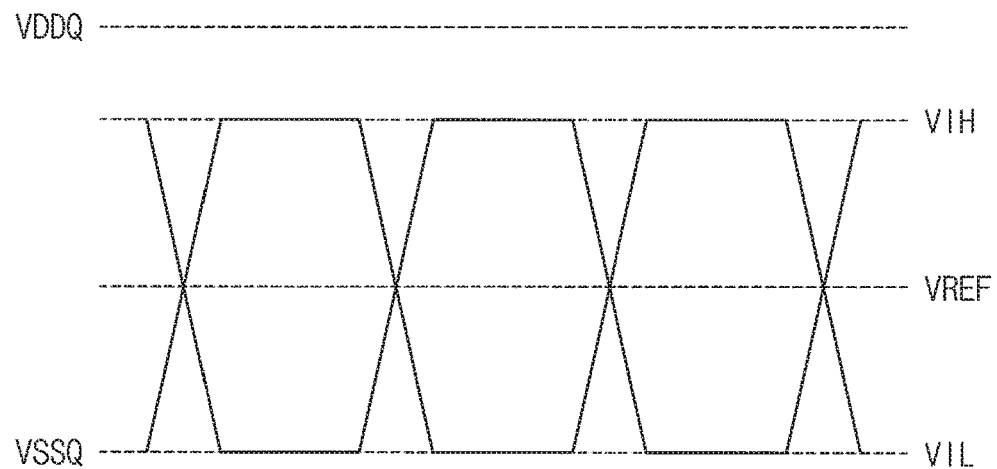

FIGS. 9A and 9B are diagrams for describing an example embodiment of a first pseudo-open drain (POD) termination.

Referring to FIG. 9A, a transmission driver DR in a transmitter device may drive an input-output pad PADH based on a transmission signal ST from an internal signal of the transmitter device. The input-output pad PADH of the transmitter device may be connected to an input-output pad PADS of a receiver device through a transmission line TL. A termination circuit ODT of the first POD termination scheme may be connected to the input-output pad PADS of the receiver device for impedance matching. The reception buffer BF in the receiver device may compare the input signal SI through the input-output pad PADS with the reference voltage VREF to provide the buffer signal SB to an internal circuit of the receiver device.

The transmission driver DR may include a pull-up unit connected between a first power supply voltage VDDQ and the input-output pad PADH and a pull-down unit connected between the input-output pad PADH and a second power supply voltage VSSQ lower than the first power supply voltage VDDQ. The pull-up unit may include a turn-on resistor RON and a PMOS transistor TP1 that is switched in response to the transmission signal ST. The pull-down unit may include a turn-on resistor RON and an NMOS transistor TN1 that is switched in response to the transmission signal ST. The turn-on resistors RON may be omitted and each turn-on resistor RON may represent a resistance between the voltage node and the input-output pad PADH when each of the transistors TP1 and TN1 is turned on.

The termination circuit ODTP1 of the first POD termination scheme may include a termination resistor RTT and an NMOS transistor TN2 that is turned on in response to a high voltage. The termination resistor RTT may be omitted and the termination resistor RTT may represent a resistance between the voltage node and the input-output pad PADS when the NMOS transistor TN2 is turned on.

In case of the termination circuit ODTP1 of the first POD termination scheme in FIG. 9A, the high voltage level VIH and the low voltage level VIL of the input signal SI may be represented as FIG. 9B. The second power supply voltage VSSQ may be assumed to be a ground voltage (e.g., VSSQ=0) and the voltage drop along the transmission line TL, etc. may be neglected. Thus, the high voltage level VIH, the low voltage level VIL and the optimal reference voltage VREF may be calculated as shown below in Expression (3).

$$VIH = VDDQ*RTT/(RON+RTT),$$

$$VIL = VSSQ = 0,$$

$$VREF = (VIH+VIL)/2 = VDDQ*RTT/2(RON+RTT) \quad \text{Expression (3)}$$

Figure 10:
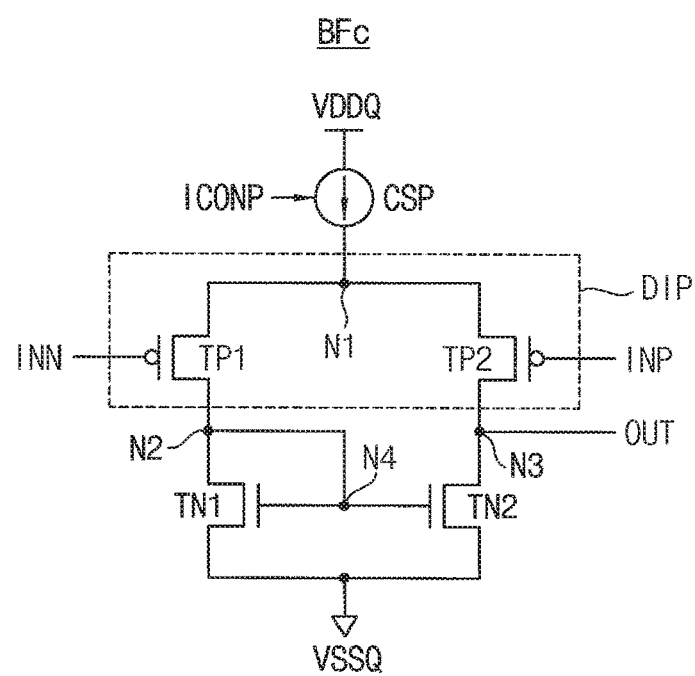
FIG. 10 is a diagram illustrating a reception buffer compatible with the first POD termination.

FIG. 10 is a diagram illustrating an example embodiment of a reception buffer compatible with the first POD termination.

Referring to FIG. 10, a reception buffer BFc may include a current source CSP, a P-type differential input pair DIP of PMOS transistors TP1 and TP2, and an N-type current mirror of the NMOS transistors TN1 and TN2.

The current source CSP is connected between the first power supply voltage VDDQ and the first node N1. The P-type differential input pair DIP is connected between the first node N1 and the second and third nodes N2 and N3. The control terminals of the P-type differential input pair DIP receive the input signal pair INN and INP. The input signal pair INN and INP may be a differential signal pair, or the single-ended signal and the reference voltage signal. The output signal OUT may be provided through the third node N3. In other example embodiments, the output signal OUT may be provided through the second node N2. The N-type current mirror TN1 and TN2 is connected between the second power supply voltage VSSQ and the second and third nodes N2 and N3, and the second node N2 and the fourth node N4 are electrically connected to form a diode-connection structure.

The reception buffer BFc of FIG. 10 includes only the P-type differential input pair DIP and does not include the N-type differential input pair DIN. In case of the first POD termination, the average voltage level of the input signal SI is lower than (VDDQ–VSSQ)/2, which is biased to the second power supply voltage VSSQ. The gate-source voltage Vgs of the input transistor has to be secured sufficiently so that a relatively large driving current may be implemented even with a relatively small-sized input transistor. When the voltage level of the input signal SI is relatively low, the PMOS transistor has a larger gate-source voltage Vgs than the NMOS transistor. Accordingly, the reception buffer BFc, which uses only a P-type differential amplifier including the P-type differential input pair DIP, is suitable for the case of the first POD termination.

In some example embodiments, the current source CSP may be omitted. In other example embodiments, the tail current of the current source CSP may be changed based on current control signal ICONP. The current control signal ICONP may be included in the above-mentioned buffer control signal BCON. The interface controller ICTRL may control the strength of the tail current of the current source CSP through the current control signal ICONP. The operation speed of the reception buffer BFc and the integrated circuit including the reception buffer BFc may be increased by increasing the tail current. As such, the interface controller ICTRL may control the buffer block BFBK such that the operation current of the enabled reception buffer among the reception buffers in the buffer block BFBK may be changed depending on the operation speed of the buffer block BFBK.

Figure 11A:
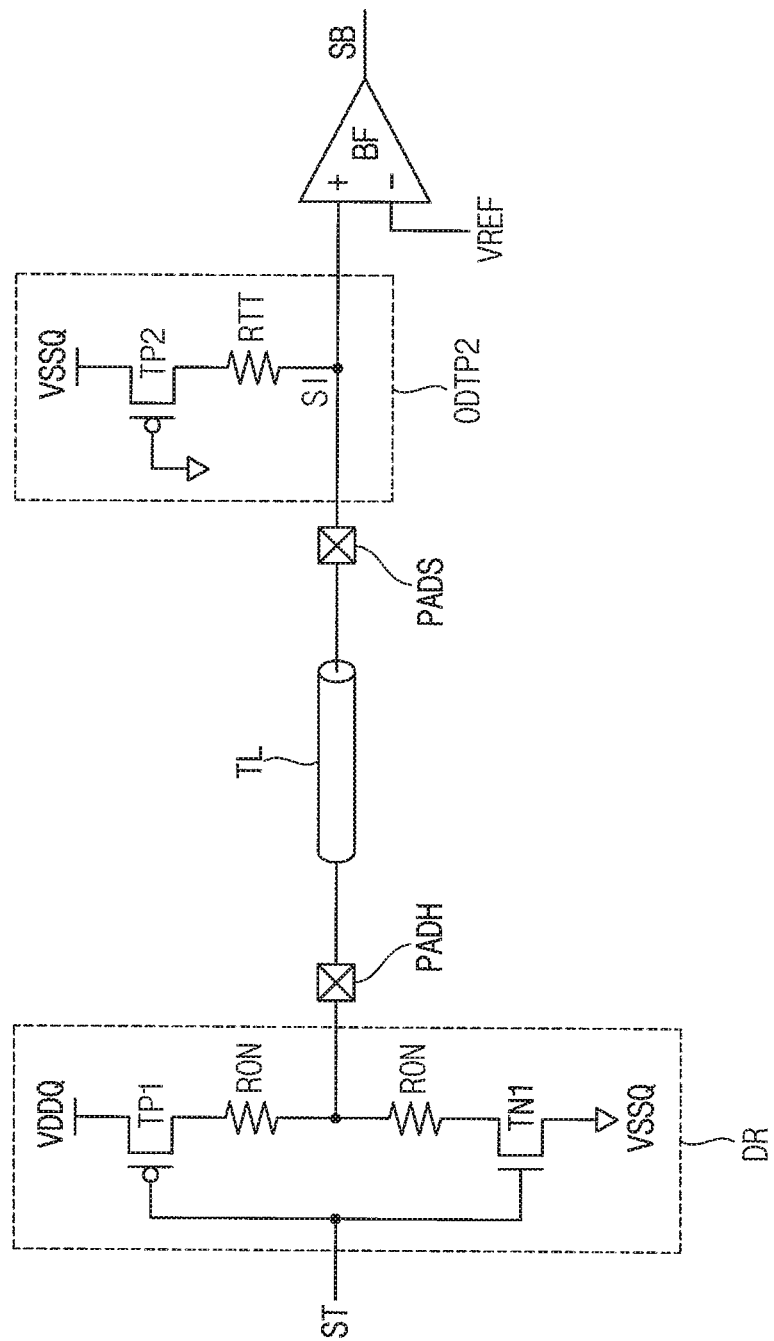
FIGS. 11A and 11B are diagrams for describing a second POD termination.
Figure 11B:
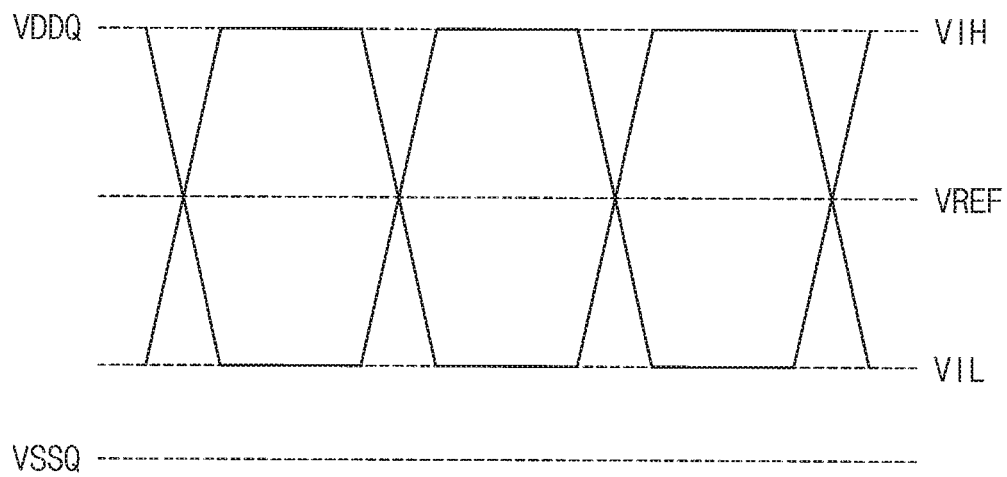

FIGS. 11A and 11B are diagrams for describing an example embodiment of a second POD termination.

Referring to FIG. 11A, a transmission driver DR in a transmitter device may drive an input-output pad PADH based on a transmission signal ST from an internal signal of the transmitter device. The input-output pad PADH of the transmitter device may be connected to an input-output pad PADS of a receiver device through a transmission line TL. A termination circuit ODTP2 of the second POD termination scheme may be connected to the input-output pad PADS of the receiver device for impedance matching. The reception buffer BF in the receiver device may compare the input signal SI through the input-output pad PADS with the reference voltage VREF to provide the buffer signal SB to an internal circuit of the receiver device.

The transmission driver DR may include a pull-up unit connected between a first power supply voltage VDDQ and the input-output pad PADH and a pull-down unit connected between the input-output pad PADH and a second power supply voltage VSSQ lower than the first power supply voltage VDDQ. The pull-up unit may include a turn-on resistor RON and a PMOS transistor TP1 that is switched in response to the transmission signal ST. The pull-down unit may include a turn-on resistor RON and an NMOS transistor TN1 that is switched in response to the transmission signal ST. The turn-on resistors RON may be omitted and each turn-on resistor RON may represent a resistance between the voltage node and the input-output pad PADH when each of the transistors TP1 and TN1 is turned on.

The termination circuit ODTP2 of the second POD termination scheme may include a termination resistor RTT and a PMOS transistor TP2 that is turned on in response to a low voltage. The termination resistor RTT may be omitted and the termination resistor RTT may represent a resistance between the voltage node and the input-output pad PADS when the NMOS transistor TN2 is turned on.

In case of the termination circuit ODTP2 of the second POD termination scheme in FIG. 11A, the high voltage level VIH and the low voltage level VIL of the input signal SI may be represented as shown in FIG. 11B. The second power supply voltage VSSQ may be assumed to be a ground voltage (e.g., VSSQ=0) and the voltage drop along the transmission line TL, etc. may be neglected. Thus, the high voltage level VIH, the low voltage level VIL and the optimal reference voltage VREF may be calculated as shown below in Expression (4).

$$VIH=VDDQ,$$

$$VIL=VDDQ*RON/(RON+RTT),$$

$$VREF=(VIH+VIL)/2=VDDQ*(2RON+RTT)/2(RON+RTT) \quad \text{Expression (4)}$$

Figure 12:
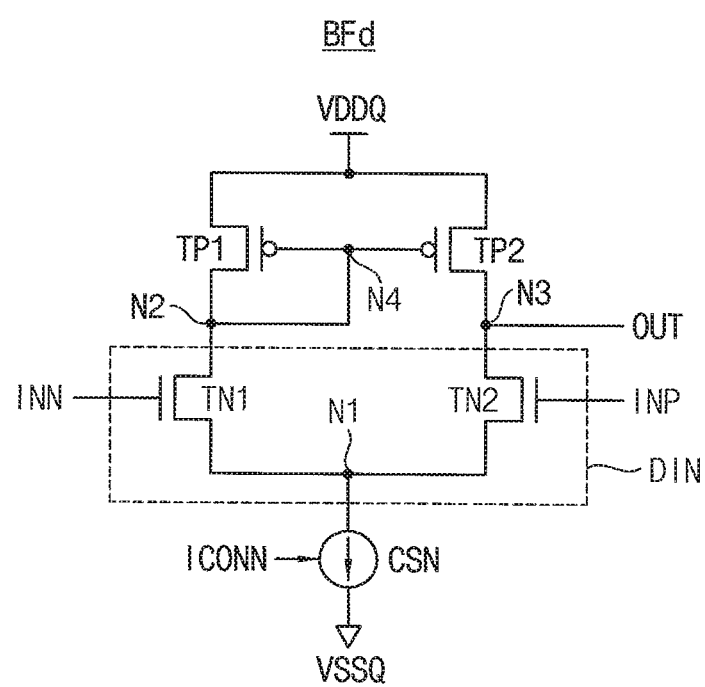
FIG. 12 is a diagram illustrating an example embodiment of a reception buffer compatible with the second POD termination.

FIG. 12 is a diagram illustrating an example embodiment of a reception buffer compatible with the second POD termination.

Referring to FIG. 12, a reception buffer BFd may include a current source CSN, an N-type differential input pair DIN of NMOS transistors TN1 and TN2, and a P-type current mirror of the PMOS transistors TP1 and TP2.

The current source CSN is connected between the second power supply voltage VSSQ and the first node N1. The N-type differential input pair DIN is connected between the first node N1 and the second and third nodes N2 and N3. The control terminals of the N-type differential input pair DIN receive the input signal pair INN and INP. The input signal pair INN and INP may be a differential signal pair, or the single-ended signal and the reference voltage signal. The output signal OUT may be provided through the third node N3. In other example embodiments, the output signal OUT may be provided through the second node N2. The P-type current mirror TP1 and TP2 is connected between the first power supply voltage VDDQ and the second and third nodes N2 and N3, and the second node N2 and the fourth node N4 are electrically connected to form a diode-connection structure.

The reception buffer BFd of FIG. 12 includes only the N-type differential input pair DIN and does not include the P-type differential input pair DIP. In case of the second POD termination, the average voltage level of the input signal SI is higher than (VDDQ−VSSQ)/2, which is biased to the first power supply voltage VDDQ. The gate-source voltage Vgs of the input transistor has to be secured sufficiently so that a relatively large driving current may be implemented even with a relatively small-sized input transistor. When the voltage level of the input signal SI is relatively high, the NMOS transistor has a larger gate-source voltage Vgs than the PMOS transistor. Accordingly the reception buffer BFd, which uses only an N-type differential amplifier including the N-type differential input pair DIN, is suitable for the case of the second POD termination.

In some example embodiments, the current source CSN may be omitted. In other example embodiments, the tail current of the current source CSN may be changed based on current control signal ICONN. The current control signal ICONN may be included in the above-mentioned buffer control signal BCON. The interface controller ICTRL may control the strength of the tail current of the current source CSN through the current control signal ICONN. The operation speed of the reception buffer BFd and the integrated circuit including the reception buffer BFd may be increased by increasing the tail current. As such, the interface controller ICTRL may control the buffer block BFBK such that the operation current of the enabled reception buffer among the reception buffers in the buffer block BFBK may be changed depending on the operation speed of the buffer block BFBK.

Figure 13A:
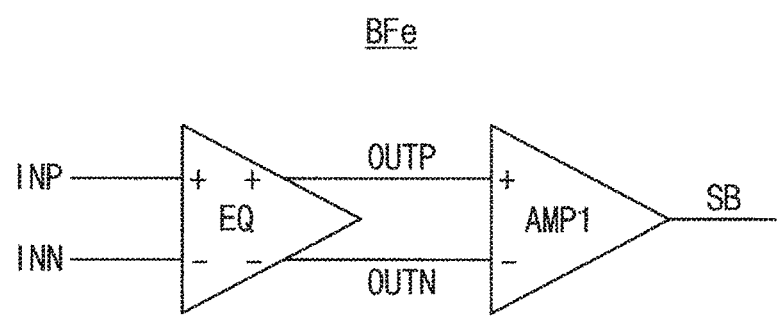
FIGS. 13A and 13B are diagrams illustrating example embodiments of reception buffers included in the buffer block in FIG. 3.
Figure 13B:
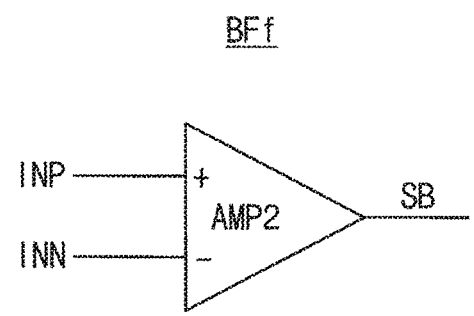

FIGS. 13A and 13B are diagrams illustrating example embodiments of reception buffers included in the buffer block in FIG. 3.

The buffer block 71 in FIG. 3 may include a first reception buffer BFe as illustrated in FIG. 13A and a second reception buffer BFf as illustrated in FIG. 13B.

Referring to FIG. 13A, the first reception buffer BFe may include an equalizer EQ configured to amplify an input signal pair INP and INN to output an output signal pair OUTP and OUTN and a first differential amplifier AMP1 configured to amplify the output signal pair OUTP and OUTN to output a single-ended signal as the buffer signal SB.

Referring to FIG. 13B, the second reception buffer BFf may include a second differential amplifier AMP2 configured to amplify the input signal pair INP and INPN to output the single-ended signal SB. The configuration of the first reception buffer BFe may be more suitable for a higher-speed operation than the second reception buffer BFf.

The interface controller 81 in FIG. 3 may enable the first reception buffer BFe instead of the second reception buffer BFf when an operation speed of the reception interface circuit increases. In contrast, the interface controller 81 may enable the second reception buffer BFf instead of the first reception buffer BFe when the operation speed of the reception interface circuit decreases.

Figure 14A:
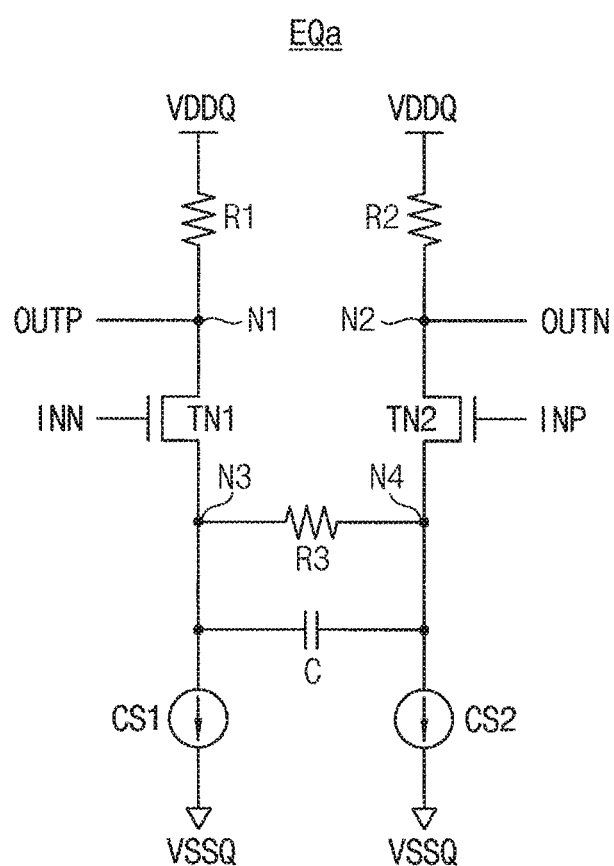
FIGS. 14A and 14B are circuit diagrams illustrating example embodiments of an equalizer included in the reception buffer of FIG. 13A.
Figure 14B:
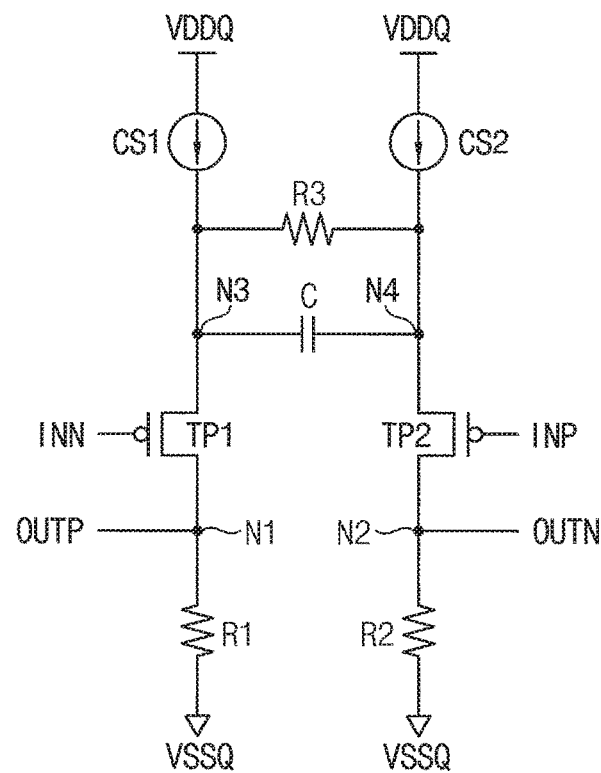

FIGS. 14A and 14B are circuit diagrams illustrating example embodiments of equalizers included in the example embodiment of the reception buffer shown in FIG. 13A.

Referring to FIG. 14A, an equalizer EQa includes a resistor pair R1 and R2, an N-type differential input pair of NMOS transistors TN1 and TN2, a resistor R3, a capacitor C and a current source pair CS1 and CS2.

The resistor pair R1 and R2 is connected between the first power supply voltage VDDQ and the first and second nodes N1 and N2. The N-type differential input pair TN1 and TN2 is connected between the first and second nodes N1 and N2 and the third and fourth nodes N3 and N4. The resistor R3 and the capacitor C are connected in parallel between the third node N3 and the fourth node N4. The current source pair CS1 and CS2 is connected between the second power supply voltage VSSQ and the third and fourth nodes N3 and N4.

The control terminals of the N-type differential input pair TN1 and TN2 receive the input signal pair INN and INP, and the output signal pair OUTP and OUTN is provided through the first and second nodes N1 and N2.

As described with reference to FIG. 12, the N-type differential input pair TN1 and TN2 may implement a relatively large gate-source voltage Vgs in case of a relatively high input voltage. Accordingly the reception buffer BFe in FIG. 13A including the equalizer EQa of FIG. 14A may be suitable for the second POD termination.

Referring to FIG. 14B, an equalizer EQb includes a resistor pair R1 and R2, a P-type differential input pair of PMOS transistors TP1 and TP2, a resistor R3, a capacitor C and a current source pair CS1 and CS2.

The resistor pair R1 and R2 is connected between the second power supply voltage VSSQ and the first and second nodes N1 and N2. The P-type differential input pair TP1 and TP2 is connected between the first and second nodes N1 and N2 and the third and fourth nodes N3 and N4. The resistor R3 and the capacitor C are connected in parallel between the third node N3 and the fourth node N4. The current source pair CS1 and CS2 is connected between the first power supply voltage VDDQ and the third and fourth nodes N3 and N4.

The control terminals of the P-type differential input pair TP1 and TP2 receive the input signal pair INN and INP, and the output signal pair OUTP and OUTN is provided through the first and second nodes N1 and N2.

As described with reference to FIG. 10, the P-type differential input pair TP1 and TP2 may implement a relatively large gate-source voltage Vgs in case of a relatively low input voltage. Accordingly the reception buffer BFe in FIG. 13A including the equalizer EQb of FIG. 14B may be suitable for the first POD termination.

Figure 15:
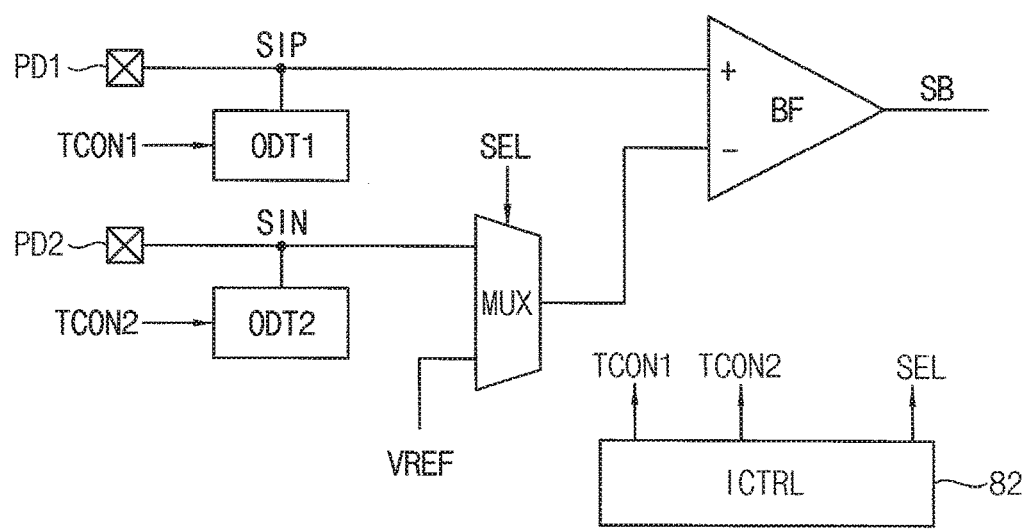
FIG. 15 is a diagram illustrating a reception interface circuit according to example embodiments.
Figure 16A:
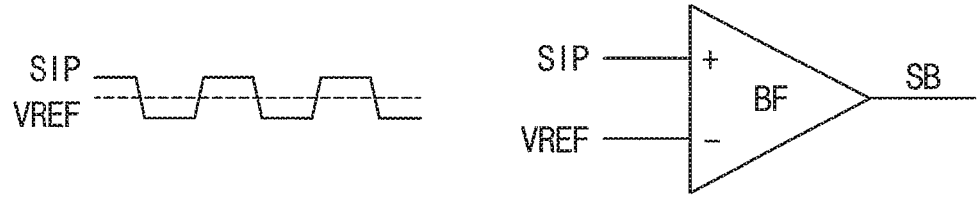
FIG. 16A is a diagram illustrating an example case when the reception interface circuit of FIG. 15 performs a fully-differential signaling.
Figure 16B:
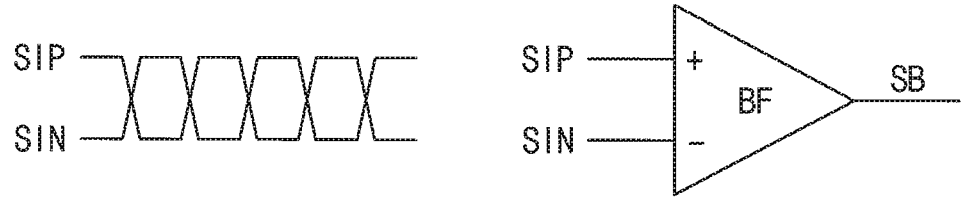
FIG. 16B is a diagram illustrating an example case when the reception interface circuit of FIG. 15 performs a pseudo-differential signaling.

FIG. 15 is a diagram illustrating a reception interface circuit according to example embodiments. FIG. 16A is a diagram illustrating an example case in which the reception interface circuit of FIG. 15 performs fully-differential signaling, and FIG. 16B is a diagram illustrating an example case in which the reception interface circuit of FIG. 15 performs pseudo-differential signaling.

FIG. 15 illustrates a reception buffer BF configured to selectively receive a differential input signal pair SIP and SIN or a single-ended input signal SIP.

Referring to FIG. 15, a reception interface circuit 52 includes a termination circuit pair ODT1 and ODT2 connected to an input-output pad pair PD1 and PD2, a selector MUX, a reception buffer BF and an interface controller ICTRL.

The reception interface circuit 52 may include a first input signal SIP and a second input signal SIN. According to the communication standard, a transmitter device may transmit a differential signal pair. In this case, the second input signal SIN may be an inversion signal of the first input signal SIP, and the reception interface circuit 52 may receive the differential input signal pair SIP and SIN through the input-output pad pair PD1 and PD2.

The termination circuit pair ODT1 and ODT2 may change the termination mode in response to the termination control signal pair TCON1 and TCON2. The interface controller 82 change the termination mode through the termination control signal pair TCON1 and TCON2. The configuration and the operation of the termination circuit pair ODT1 and ODT2 for the change of the termination mode are the same or substantially the same as described with reference to FIGS. 3 and 4.

The selector MUX may select and output one of the second input signal SIN and a reference voltage signal VREF in response to a selection signal SEL. The selection signal SEL may be included in the above-mentioned buffer control signal BCON. The reception buffer BF may receive the first input signal SIP through a first input terminal (+) and the output of the selector MUX through a second input terminal (−) to output the buffer signal SB that is a single-ended signal.

When the selector MUX selects and outputs the reference voltage signal VREF, the reception buffer BF may compare the first input signal SIP and the reference voltage signal VREF to output the buffer signal SB as illustrated in FIG. 16A. As a result, the reception buffer BF may receive the signal-ended input signal SIP and perform the reception operation corresponding to single-ended signaling.

When the selector MUX selects and outputs the second input signal SIN, the reception buffer BF may compare the first input signal SIP and the second input signal SIN to output the buffer signal SB as illustrated in FIG. 16B. As a result, the reception buffer BF may receive the differential input signal pair SIP and SIN and perform the reception operation corresponding to fully-differential signaling.

As such, the interface controller 82 may change the signaling scheme of the reception buffer BF between the fully-differential signaling and the pseudo-differential signaling (e.g., the single-ended signaling), through the control of the selection signal SEL.

Figure 17:
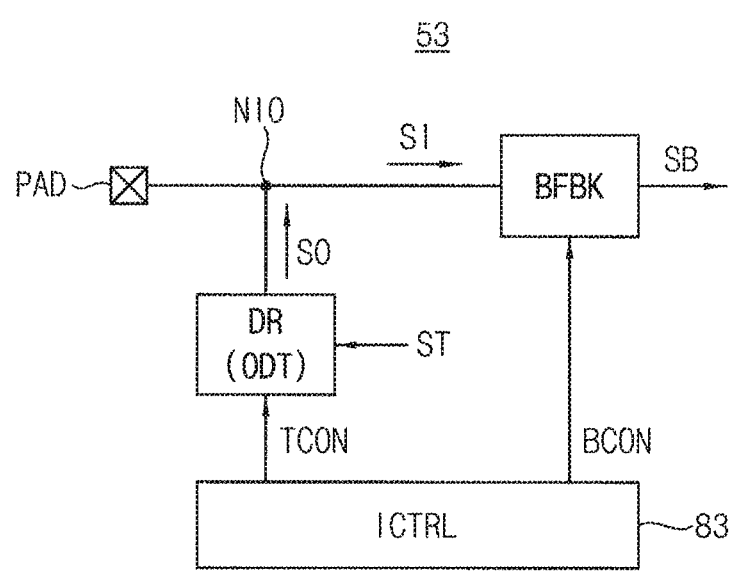
FIG. 17 is a diagram illustrating an interface circuit according to example embodiments.

FIG. 17 is a diagram illustrating an interface circuit according to example embodiments.

Referring to FIG. 17, an interface circuit 53 may include a buffer block BFBK, a transmission driver DR and an interface controller ICTRL 83.

The buffer block BFBK may buffer an input signal SI provided through an input-output pad PAD to transfer a buffer signal SB to an internal circuit. The transmission driver DR may output an output signal SO to the input-output pad PAD based on a transmission signal ST provided from the internal circuit. As will be described below with reference to FIGS. 18 and 19, the termination circuit ODT may be included in the transmission driver DR that drives the input-output pad PAD.

The termination circuit ODT may change the termination mode in response to a termination control signal TCON. The buffer block BFBK may change the reception characteristic of itself in response to a buffer control signal BCON. The interface controller ICTRL may generate the termination control signal TCON and the buffer control signal BCON such that the reception characteristic of the buffer block is changed in association with a change of the termination mode.

Figures 18, 19:
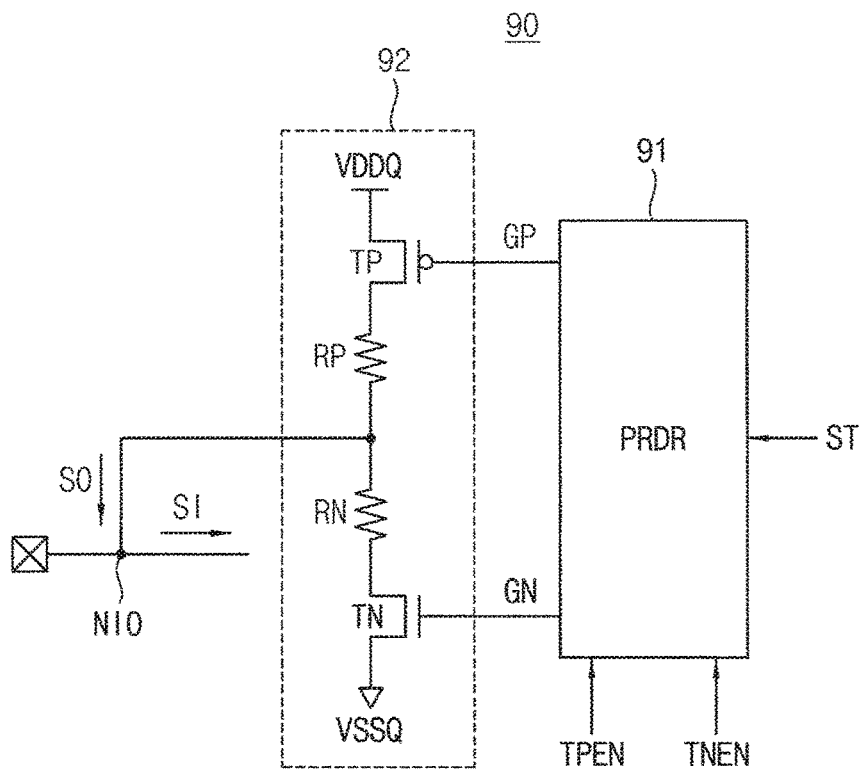
FIG. 18 is a diagram illustrating an example embodiment of a transmission driver included in the interface circuit of FIG. 17.
FIG. 19 is a diagram illustrating example operation of the transmission driver of FIG. 18.

FIG. 18 is a diagram illustrating an example embodiment of a transmission driver included in the interface circuit of FIG. 17, and FIG. 19 is a diagram illustrating an example operation of the transmission driver of FIG. 18.

Referring to FIG. 18, a transmission driver 90 may include a pre-driver PRDR 91 and a driving unit 92. The pre-driver 91 may generate a first driving signal GP and a second driving signal GN based on a transmission signal, a first termination enable signal TPEN and a second termination enable signal TNEN. The driving unit 92 may drive the input-output node NIO based on the first driving signal GP and the second driving signal GN.

In some example embodiments, the driving unit 92 may include a pull-up unit connected between the first power supply voltage VDDQ and the input-output node NIO and a pull-down unit connected between the input-output node NIO and the second power supply voltage VSSQ. The pull-up unit may include a resistor RP and a PMOS transistor TP that is switched in response to the first driving signal GP. The pull-down unit may include a resistor RN and an NMOS transistor TN that is switched in response to the second driving signal GN. The resistors RP and RN may be omitted and each of the resistors RP and RN may represent a resistance between the voltage node and the input-output node NIO when each of the transistors TP and TN is turned on.

Referring to FIG. 19, both of the first termination enable signal TPEN and the second termination enable signal TNEN may be deactivated in the logic low level L during the transmission operation. In this case, the pre-driver 91 may determine the logic levels of the first driving signal GP and the second driving signal GN depending on the logic level of the transmission signal. As a result, the driving unit 92 may perform the transmission operation to output the output signal SO to the input-output node NIO based on the transmission signal ST.

During the reception operation for receiving the input signal SI through the input-output node NIO, at least one of the first termination enable signal TPEN and the second termination enable signal TNEN may be activated in the logic high level H. In this case, the pre-driver 91 may determine the logic levels of the first driving signal GP and the second driving signal GN based on the first termination enable signal TPEN and the second termination enable signal TNEN regardless of the transmission signal ST.

When both of the first termination enable signal TPEN and the second termination enable signal TNEN are in the logic high level H, the pre-driver 91 outputs the first driving signal GP in the logic low level L and the second driving signal GN in the logic high level H. In this case, both of the PMOS transistor TP and the NMOS transistor TN are turned on, and thus, the above-mentioned center-tapped termination CTT may be implemented by the driving unit 92.

When the first termination enable signal TPEN is in the logic low level L and the second termination enable signal TNEN is in the logic high level H, the pre-driver 91 outputs the first driving signal GP in the logic high level H and the second driving signal GN in the logic high level H. In this case, the PMOS transistor TP is turned off, the NMOS transistor TN is turned on, and thus, the above-mentioned first POD termination POD_N may be implemented by the driving unit 92.

When the first termination enable signal TPEN is in the logic high level H and the second termination enable signal TNEN is in the logic low level L, the pre-driver 91 outputs the first driving signal GP in the logic low level L and the second driving signal GN in the logic low level L. In this case, the PMOS transistor TP is turned on, the NMOS transistor TN is turned off, and thus, the above-mentioned second POD termination POD_P may be implemented by the driving unit 92.

As such, the interface controller 83 may implement the termination mode using the driving unit 92 as the termination circuit, through the control of the first termination enable signal TPEN and the second termination enable signal TNEN that are included in the termination control signal TCON.

Figure 20:
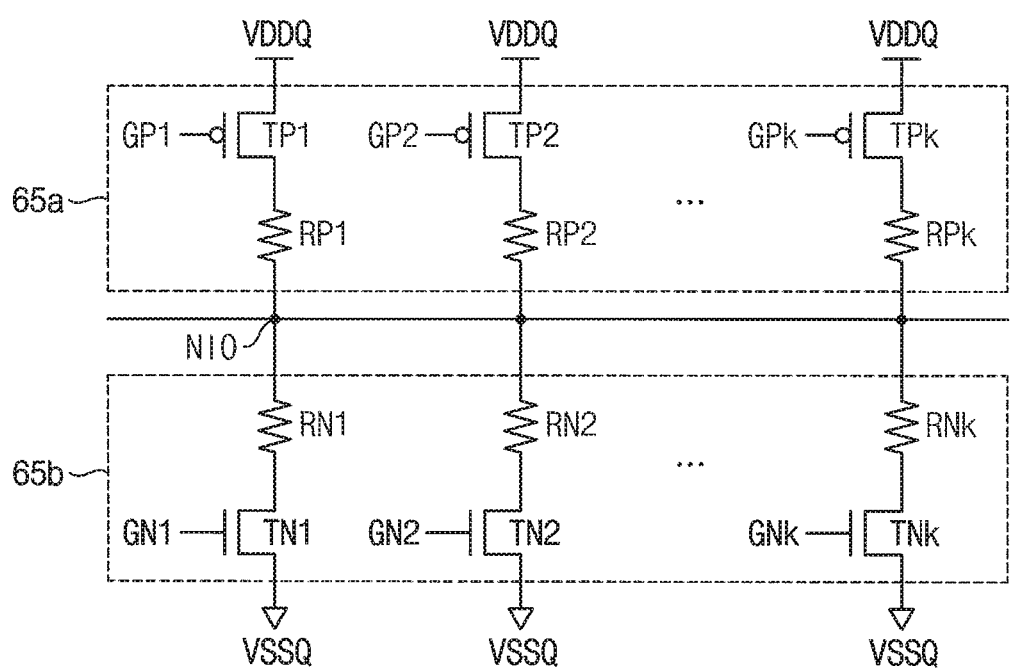
FIG. 20 is a diagram illustrating an example embodiment of a termination circuit.

FIG. 20 is a diagram illustrating an example embodiment of a termination circuit.

Referring to FIG. 20, the termination circuit 65 may change the termination mode in response to the termination control signal TCON. The termination control signal TCON includes first through k-th up switch control signals GP1~GPk and first through k-th down switch control signals GN1~GNk. The termination circuit 65 may include a first sub termination circuit 65a and a second sub termination circuit 65b. The first sub termination circuit 65a may control the electrical connection between the input-output node NIO and the first power supply voltage VDDQ in response to the first through k-th up switch control signals GP1~GPk. The second sub termination circuit 65b may control the electrical connection between the input-output node NIO and the second power supply voltage VDDQ in response to the first through k-th down switch control signals GN1~GNk.

The first sub termination circuit 65a may include first through k-th up switches and termination resistors RP1~RPk. The first through k-th up switches may be PMOS transistors TP1~TPk that are turned on by the low voltage. The second sub termination circuit 65b may include first through k-th down switches and termination resistors RN1~RNk. The first through k-th down switches may be NMOS transistors TN1~TNk that are turned on by the high voltage. The termination resistors RP1~RPk and RN1~RNk may be omitted and each of the termination resistors RP1~RPk and RN1~RNk may represent a resistance between the voltage node and the input-output node NIO when each of the transistors TP1~TPk and TN1~TNk is turned on.

When all of the up switch control signals GP1~GPk are the logic low level and all of the down switch control signals GN1~GNk are the logic high level, all of the PMOS transistors TP1~TPk in the termination circuit 65 are turned on, all of the NMOS transistors TN1~TNk in the termination circuit 65 are turned on, and thus, the termination mode TMD may be determined as the center-tapped termination CTT.

When all of the up switch control signals GP1~GPk are the logic high level and all of the down switch control signals GN1~GNk are the logic low level, all of the PMOS transistors TP1~TPk in the termination circuit 65 are turned off, all of the NMOS transistors TN1~TNk in the termination circuit 65 are turned off, and thus, the termination mode TMD may be determined as the untermination UNT.

When all of the up switch control signals GP1~GPk are the logic high level and all of the down switch control signals GN1~GNk are the logic high level, all of the PMOS transistors TP1~TPk in the termination circuit 65 are turned off, all of the NMOS transistors TN1~TNk in the termination circuit 65 are turned on, and thus, the termination mode TMD may be determined as the first POD termination POD_N.

When all of the up switch control signals GP1~GPk are the logic low level and all of the down switch control signals GN1~GNk are the logic low level, all of the PMOS transistors TP1~TPk in the termination circuit 65 are turned on, all of the NMOS transistors TN1~TNk in the termination circuit 65 are turned off, and thus, the termination mode TMD may be determined as the second POD termination POD_P.

As such, the termination mode may be determined using the up switch control signals GP1~GPk and the down switch control signals GN1~GNk. Furthermore, the synthetic resistance of the termination circuit 65 may be controlled by adjusting the number of the activated up switch control signals GP1~GPk and/or the number of the activated down switch control signals GN1~GNk.

Figure 21:
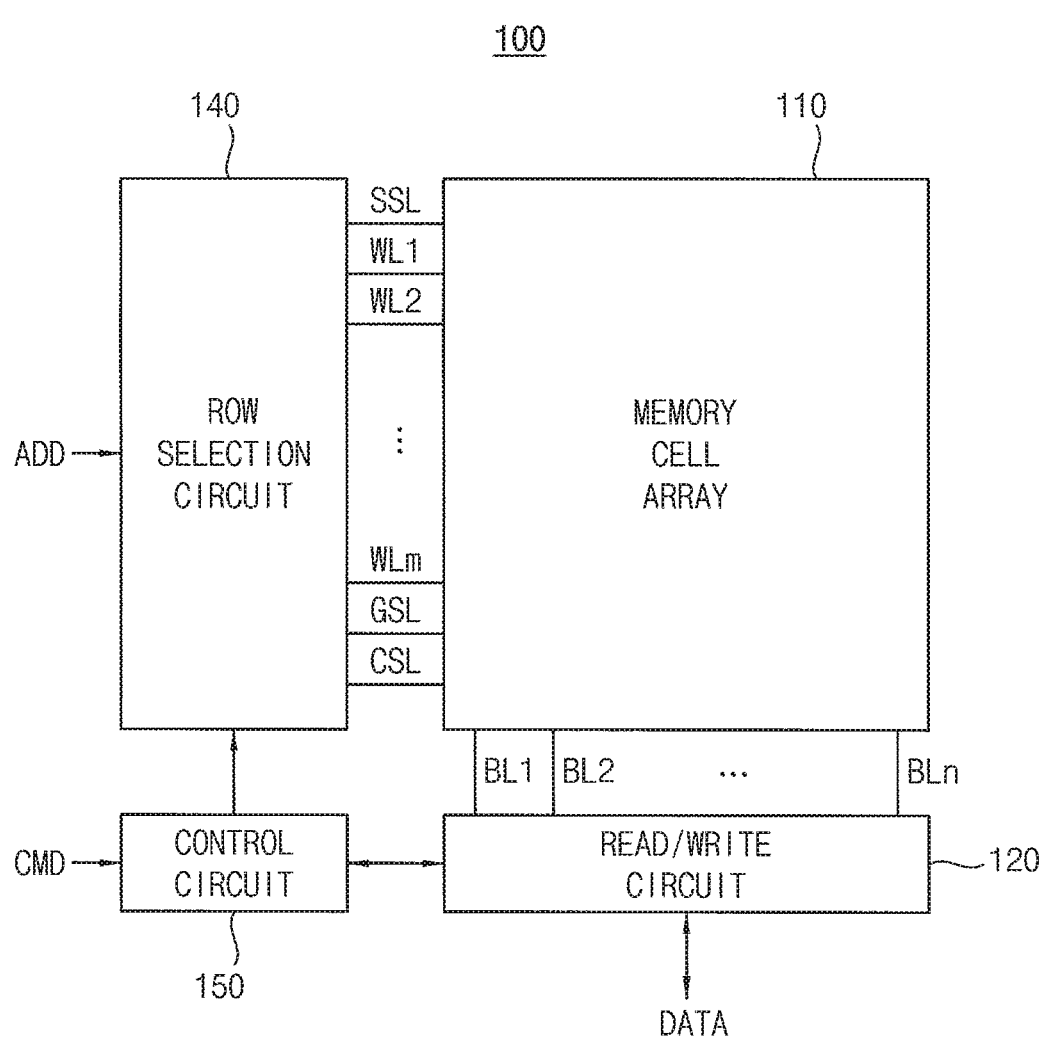
FIG. 21 is a block diagram illustrating a memory device according to example embodiments.
Figure 22A:
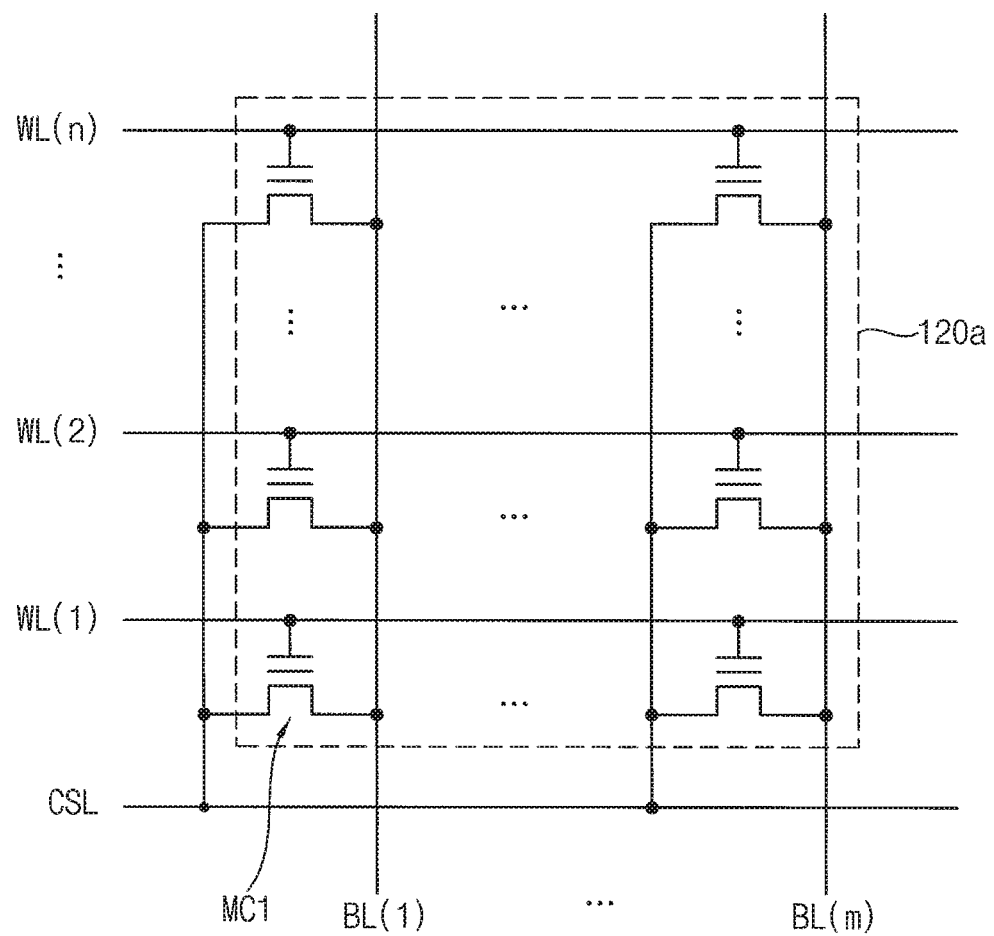
FIGS. 22A, 22B and 22C are diagrams illustrating examples of a memory cell array included in the memory device of FIG. 21.
Figure 22B:
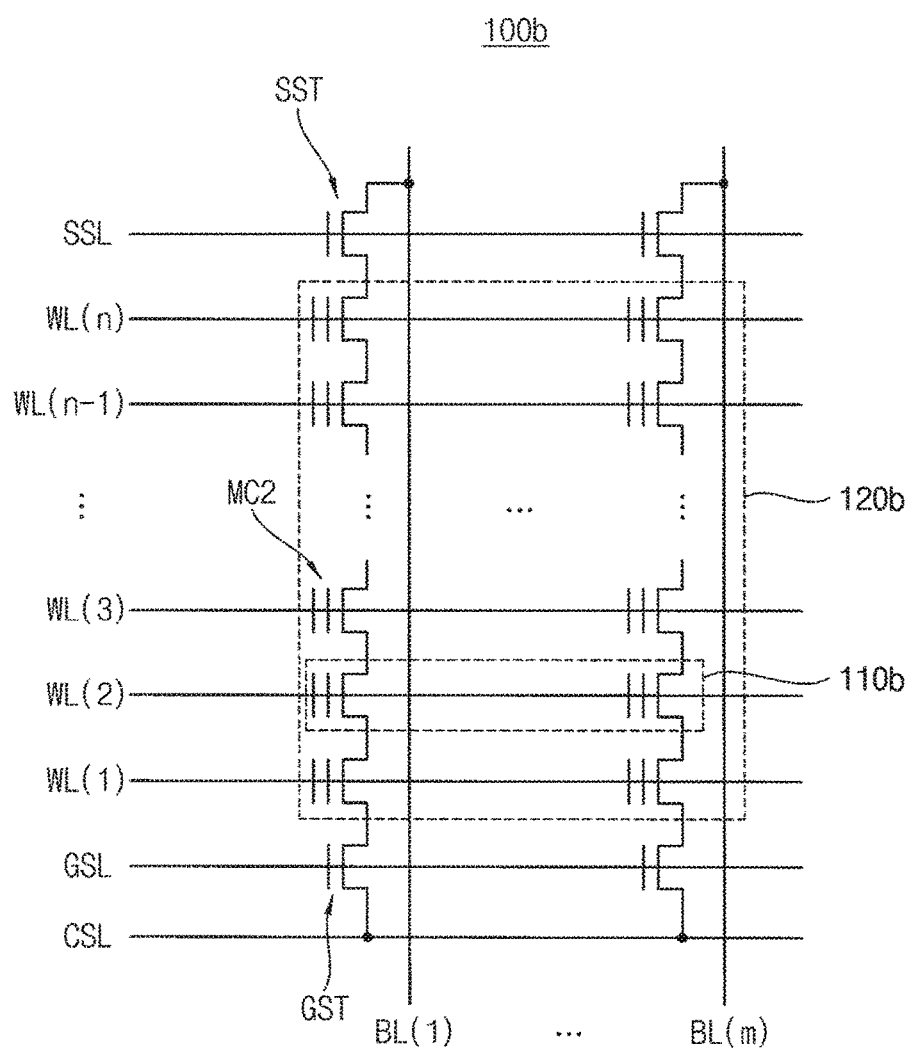
Figure 22C:
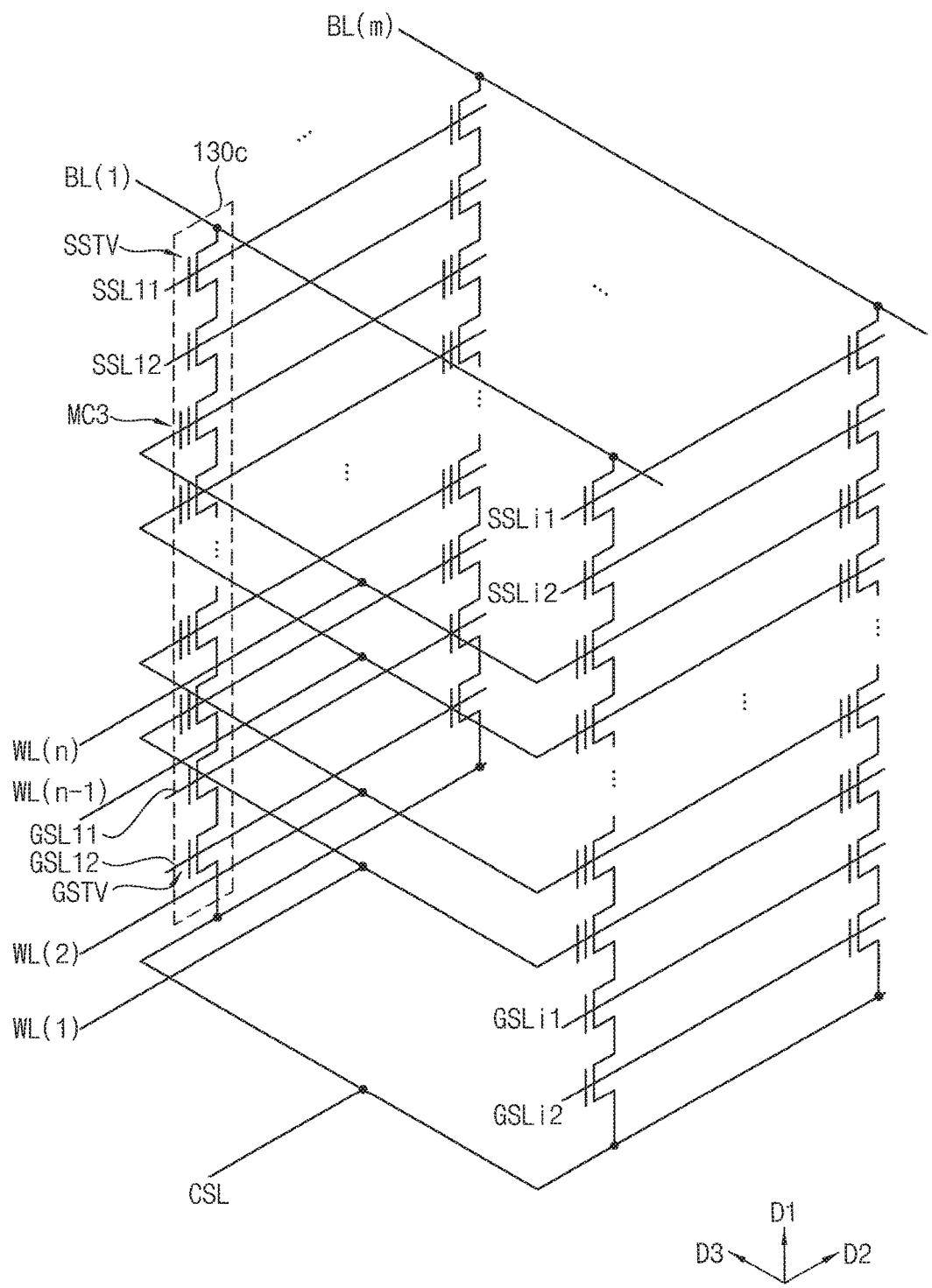

FIG. 21 is a block diagram illustrating a memory device according to example embodiments, and FIGS. 22A, 22B and 22C are diagrams illustrating examples of memory cell arrays included in the memory device of FIG. 21. For convenience of description, a NAND flash memory device is illustrated in FIGS. 21, 22A, 22B and 22C as an example of the non-volatile memory device.

Referring to FIG. 21, a flash memory device 100 may include a memory cell array 110, a read/write circuit 120, a row selection circuit 140 and a control circuit 150. The memory cell array 110 may include a plurality of memory cells. Each memory cell may store one-bit data or multi-bit data.

The memory cell storing one bit may be referred to as a single-level cell (SLC) and the memory cell storing multiple bits may be referred to as a multi-level cell (MLC). The memory cell array 110 may include a main region for storing general data and a spare region for storing additional information including, for example, flag information, error correction code, device code, maker code, page information, etc. In some example embodiments, the main region may include the MLCs and the spare region may include SLCs or MLCs.

The memory cell array 110 may include a plurality of memory cells that are disposed at cross points of a plurality of rows or word line and a plurality of columns or bit lines. The memory cells in the memory cell array 110 may form a plurality of memory blocks.

The control circuit 150 may control the overall operations associated with the write, read and erase operations of the flash memory device 100. The data to be programmed may be loaded to the read/write circuit 120 under control of the control circuit 150. During the program operation, the control circuit 150 may control the row selection circuit 140 and the read/write circuit 120 so that the program voltage Vpgm is applied to the selected word line, the program pass voltage Vpass is applied to the unselected word lines, and the bulk bias voltage (e.g., about 0V) is applied to the bulk of the memory cells.

The program voltage Vpgm may be generated according to incremental step pulse programming (ISPP). The level of the program voltage Vpgm may be increased or decreased sequentially by a voltage interval as the program loops are repeated. The number of the program pulses, the voltage levels of the program pulses, the duration time of each program pulse, etc., may be determined by the control circuit 150 or by an external memory controller.

The control circuit 150 may generate the bulk voltage or the word line voltages, such as the program voltage Vpgm, the pass voltage Vpass, the program verification voltage Vpvf, the read voltage Vread, etc. The row selection circuit 140 may select one memory block in the memory cell array 110 and one word line in the selected memory block, in response to the row address and the control signals from the control circuit 150. The row selection circuit 140 may provide the corresponding word line voltages to the selected word line and the unselected word lines in response to the control signals from the control circuit 150.

The read/write circuit 120 is controlled by the control circuit 150 to operate as a sense amplifier or a write driver depending on the operation mode. For example, the read/write circuit 120 may operate as a sense amplifier for reading out the data from the memory cell array 110 during a verification read operation or a normal read operation. The data output during a normal read operation may be provided to an external device, such as a memory controller or a host device, while the data output during a verification read operation may be provided to a pass/fail verification circuit (not shown).

In case of a write operation, the read/write circuit 120 may operate as the write driver for driving the bit lines based on the data to be written in the memory cell array 110. The read/write circuit 120 may receive the data from the external device and drive the bit lines based on the received data. The read/write circuit 120 may include a plurality of page buffers corresponding to a plurality of rows of bit lines.

In programming the memory cells coupled to the selected word line, the program voltage Vpgm and the program verification voltage Vpvf may be applied alternatively to the selected word line. For the verification operation, the bit lines coupled to the selected memory cells may be precharged. The voltage change of the precharged bit line may be detected by the corresponding page buffer. The detected data during the verification read operation may be provided to the pass/fail verification circuit to determine whether the corresponding memory cell has been programmed successfully.

FIGS. 22A, 22B and 22C are diagrams illustrating examples of memory cell arrays included in the memory device of FIG. 21.

FIG. 22A is a circuit diagram illustrating a memory cell array included in a NOR flash memory device, FIG. 22B is a circuit diagram illustrating a memory cell array included in a NAND flash memory device, and FIG. 22C is a circuit diagram illustrating a memory cell array included in a vertical flash memory device.

Referring to FIG. 22A, a memory cell array 100a may include a plurality of memory cells MC1. Memory cells in the same column may be connected in parallel between one of bitlines BL(1), . . . , BL(m) and a common source line CSL. Memory cells in the same row may be commonly connected to the same wordline among wordlines WL(1), . . . , WL(n). For example, memory cells in a first column may be connected in parallel between a first bitline BL(1) and the common source line CSL. Memory cells in a first row may be commonly connected to a first wordline WL(1). The memory cells MC1 may be controlled by a voltage on the wordlines WL(1), . . . , WL(n).

In the NOR flash memory device including the memory cell array 100a, a read operation and a program operation may be performed per byte or word, and an erase operation may be performed per block 120a. In the program operation, a bulk voltage having a range of about −0.1 to about −0.7 volts may be applied to a bulk substrate of the NOR flash memory device.

Referring to FIG. 22B, the memory cell array 100b may include string select transistors SST, ground select transistors GST and a plurality of memory cells MC2. The string select transistors SST may be connected to bitlines BL(1), . . . , BL(m), and the ground select transistors GST may be connected to a common source line CSL. The memory cells MC2 may be connected in series between the string select transistors SST and the ground select transistors GST. Memory cells in the same row may be connected to the same wordline among wordlines WL(1), . . . , WL(n). For example, 16, 32 or 64 wordlines may be disposed between a string select line SSL and a ground select line GSL.

The string select transistors SST may be connected to the string select line SSL, and may be controlled by a voltage on the string select line SSL. The ground select transistors GST may be connected to the ground select line GSL, and may be controlled by a voltage on the ground select line GSL. The memory cells MC2 may be controlled by a voltage on the wordlines WL(1), . . . , WL(n).

In the NAND flash memory device including the memory cell array 100b, a read operation and a program operation may be performed per page 110b, and an erase operation may be performed per block 120b. During the program operation, a bulk voltage having a level of about 0 volts may be applied to a bulk substrate of the NAND flash memory device. According to example embodiments, each page buffer may be connected to an odd-numbered bitline and an even-numbered bitline. In this case, the odd-numbered bitlines may form odd-numbered pages, the even-numbered bitlines may form even-numbered pages, and program operations for the odd-numbered pages and the even-numbered pages may be alternately performed.

Referring to FIG. 22C, a memory cell array 100c may include a plurality of strings 130c each of which has a vertical structure. The plurality of strings 130c may be formed in a second direction to define a string column, and a plurality of string columns may be formed in a third direction to define a string array. Each string may include string select transistors SSTV, ground select transistors GSTV, and a plurality of memory cells MC3 that are formed in a first direction D1 and are connected in series between the string select transistors SSTV and the ground select transistors GSTV.

The string select transistors SSTV may be connected to bitlines BL(1), . . . , BL(m), and the ground select transistors GST may be connected to a common source line CSL. The string select transistors SSTV may be connected to string select lines SSL11, SSL12, . . . , SSLi1, SSLi2, and the ground select transistors GSTV may be connected to ground select lines GSL11, GSL12, . . . , GSLi1, GSLi2. The memory cells in the same layer may be connected to the same wordline among wordlines WL(1), WL(2), . . . WL(n−1), WL(n). Each string select line and each ground select line may extend in the second direction D2, and the string select lines SSL11, . . . , SSLi2 and the ground select lines GSL11, . . . , GSLi2 may be formed in the third direction D3. Each wordline may extend in the second direction D2, and the wordlines WL(1), . . . , WL(n) may be formed in the first direction D1 and the third direction D3. Each bitline may extend in the third direction D3, and the bitlines BL(1), . . . , BL(m) may be formed in the second direction D2. The memory cells MC3 may be controlled by a voltage on the wordlines WL(1), . . . , WL(n).

Similarly to the NAND flash memory device, in the vertical flash memory device including the memory cell array 100c, a read operation and a program operation may be performed per page, and an erase operation may be performed per block.

Although not illustrated in FIG. 22C, two string select transistors included in a single string may be connected to a single string select line, and two ground select transistors included in the single string may be connected to a single ground select line. According to example embodiments, the single string may include one string select transistor and one ground select transistor.

According to at least some example embodiments, nonvolatile memories discussed herein may be embodied to include a three dimensional (3D) memory array. The 3D memory array may be monolithically formed on a substrate (e.g., semiconductor substrate such as silicon, or semiconductor-on-insulator substrate). The 3D memory array may include two or more physical levels of memory cells having an active area disposed above the substrate and circuitry associated with the operation of those memory cells, whether such associated circuitry is above or within such substrate. The layers of each level of the array may be directly deposited on the layers of each underlying level of the array. In example embodiments, the 3D memory array may include vertical NAND strings that are vertically oriented such that at least one memory cell is located over another memory cell. The at least one memory cell may comprise a charge trap layer.

The following patent documents, which are hereby incorporated by reference in their entirety, describe suitable configurations for three-dimensional memory arrays, in which the three-dimensional memory array is configured as a plurality of levels, which word lines and/or bit lines shared between levels: U.S. Pat. Nos. 7,679,133; 8,553,466; 8,654,587; 8,559,235; and U.S. Patent Application Publication No. 2011/0233648.

Figure 23:
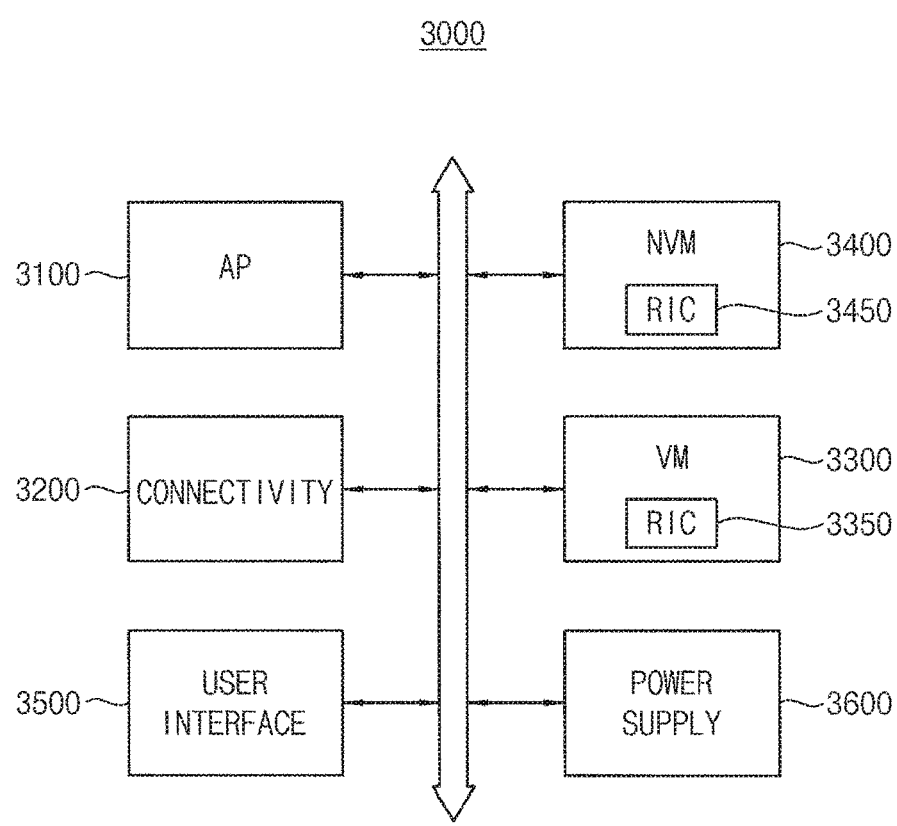
FIG. 23 is a block diagram illustrating a mobile system according to example embodiments.

FIG. 23 is a block diagram illustrating a mobile system according to example embodiments.

Referring to FIG. 23, a mobile system 3000 includes an application processor (AP) 3100, a connectivity unit 3200, a volatile memory device (VM) 3300, a nonvolatile memory device (NVM) 3400, a user interface 3500, and a power supply 3600.

The application processor 3100 may execute applications such as a web browser, a game application, a video player, etc. The connectivity unit 3200 may perform wired or wireless communication with an external device.

The volatile memory device 3300 may store data processed by the application processor 3100, or may operate as a working memory. For example, the volatile memory device 3300 may be a dynamic random access memory (DRAM), such as double data rate synchronous dynamic random-access memory (DDR SDRAM), low power DDR SDRAM (LPDDR SDRAM), graphics DDR SDRAM (GDDR SDRAM), Rambus DRAM (RDRAM), etc. The volatile memory device 3300 may include a reception interface circuit RIC 3350 according to example embodiments as describe above for supporting various communication standards by changing the reception characteristic in association with the termination mode.

The nonvolatile memory device 3400 may store a boot image for booting the mobile system 3000. For example, the nonvolatile memory device 3400 may be an electrically erasable programmable read-only memory (EEPROM), a flash memory, a phase change random access memory (PRAM), a resistance random access memory (RRAM), a nano floating gate memory (NFGM), a polymer random access memory (PoRAM), a magnetic random access memory (MRAM), a ferroelectric random access memory (FRAM), etc. The nonvolatile memory device 3400 may include a reception interface circuit RIC 3450 according to example embodiments as describe above for supporting various communication standards by changing the reception characteristic in association with the termination mode.

The user interface 3500 may include at least one input device, such as a keypad, a touch screen, etc., and at least one output device, such as a speaker, a display device, etc. The power supply 3600 may supply a power supply voltage to the mobile system 3000.

As is traditional in the field of the inventive concepts, embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the embodiments may be physically separated into two or more interacting and discrete blocks, units and/or modules without departing from the scope of the inventive concepts. Further, the blocks, units and/or modules of the embodiments may be physically combined into more complex blocks, units and/or modules without departing from the scope of the inventive concepts.

As described above, reception interface circuits according to example embodiments may support various communication standards by changing reception characteristics of the buffer block in association with the termination mode. Using reception interface circuits according to example embodiments, communication efficiency of transceiver systems such as a memory system may be enhanced and/or compatibility between a transmitter device and a receiver device may be enhanced.

Inventive concepts may be applied to any devices and/or systems including a memory device requiring and/or utilizing a refresh operation. For example, inventive concepts may be applied to systems such as be a mobile phone, a smart phone, a personal digital assistant (PDA), a portable multimedia player (PMP), a digital camera, a camcorder, personal computer (PC), a server computer, a workstation, a laptop computer, a digital TV, a set-top box, a portable game console, a navigation system, etc.

The foregoing is illustrative of example embodiments and is not to be construed as limiting thereof. Although a few example embodiments have been described, those skilled in the art will readily appreciate that many modifications are possible in the example embodiments without materially departing from inventive concepts.

What is claimed is:

1. A reception interface circuit comprising:
   a termination circuit configured to change a termination mode in response to a termination control signal;
   a buffer configured to change a reception characteristic in response to a buffer control signal;
   an interface controller configured to generate the termination control signal and the buffer control signal such that the reception characteristic of the buffer is changed in association with the change in the termination mode;
   wherein the termination circuit includes
      a first sub termination circuit configured to control an electrical connection between an input-output node and a first power supply voltage in response to a first switch control signal, and
      a second sub termination circuit configured to control an electrical connection between the input-output node and a second power supply voltage in response to a second switch control signal, the second power supply voltage lower than the first power supply voltage; and
   wherein the buffer includes
      a first reception buffer including a plurality of first differential input pairs of transistors, the plurality of first differential input pairs of transistors including both a first N-type differential input pair of NMOS transistors and a first P-type differential input pair of PMOS transistors,
      a second reception buffer including a single second differential input pair of transistors, the single second differential input pair of transistors being a P-type differential input pair of PMOS transistors, and
      a third reception buffer including a single third differential input pair of transistors, the single third differential input pair of transistors being an N-type differential input pair of NMOS transistors.

2. The reception interface circuit of claim 1, wherein
   the first reception buffer, the second reception buffer and the third reception buffer have different reception characteristics; and
   the interface controller is further configured to control the buffer through the buffer control signal such that one of the first reception buffer, the second reception buffer and the third reception buffer is enabled based on the termination mode.

3. The reception interface circuit of claim 2, wherein the interface controller is further configured to control the buffer such that an operation current of the one of the first reception buffer, the second reception buffer and the third reception buffer is changed based on an operation speed of the reception interface circuit.

4. The reception interface circuit of claim 1, wherein
   the first reception buffer, the second reception buffer and the third reception buffer are configured to be selectively enabled in association with selective enabling of at least one of the first sub termination circuit and the second sub termination circuit.

5. The reception interface circuit of claim 1, wherein the interface controller is further configured to enable the first reception buffer when both the first sub termination circuit and the second sub termination circuit are enabled.

6. The reception interface circuit of claim 1, wherein the interface controller is further configured to enable the first reception buffer when both the first sub termination circuit and the second sub termination circuit are disabled.

7. The reception interface circuit of claim 1, wherein the interface controller is further configured to enable the second reception buffer when the first sub termination circuit is disabled and the second sub termination circuit is enabled.

8. The reception interface circuit of claim 1, wherein the interface controller is further configured to enable the third reception buffer when the first sub termination circuit is enabled and the second sub termination circuit is disabled.

9. The reception interface circuit of claim 1, wherein
the first reception buffer includes an equalizer and a first differential amplifier, the equalizer configured to amplify an input signal pair to output an output signal pair, and the first differential amplifier configured to amplify the output signal pair to output a first single-ended signal; and
the second reception buffer includes a second differential amplifier, the second differential amplifier configured to amplify the input signal pair to output a second single-ended signal.

10. The reception interface circuit of claim 9, wherein the interface controller is further configured to
enable the first reception buffer in response to an increase in operation speed of the reception interface circuit; and
enable the second reception buffer in response to a decrease in the operation speed of the reception interface circuit.

11. The reception interface circuit of claim 1, wherein the buffer is configured to selectively receive a differential input signal pair or a single-ended input signal.

12. The reception interface circuit of claim 1, further comprising:
a transmission driver configured to drive the input-output node, the transmission driver including the termination circuit.

13. A memory system comprising:
a memory device; and
a memory controller configured to control the memory device;
wherein the memory device includes
a termination circuit configured to change a termination mode in response to a termination control signal,
a buffer configured to change a reception characteristic in response to a buffer control signal, and
an interface controller configured to generate the termination control signal and the buffer control signal such that the reception characteristic of the buffer is changed in association with the change in the termination mode;
wherein the termination circuit includes
a first sub termination circuit configured to control an electrical connection between an input-output node and a first power supply voltage in response to a first switch control signal, and
a second sub termination circuit configured to control an electrical connection between the input-output node and a second power supply voltage in response to a second switch control signal, the second power supply voltage lower than the first power supply voltage; and
wherein the buffer includes
a first reception buffer including a plurality of first differential input pairs of transistors, the plurality of first differential input pairs of transistors including both a first N-type differential input pair of NMOS transistors and a first P-type differential input pair of PMOS transistors,
a second reception buffer including a single second differential input pair of transistors, the single second differential input pair of transistors being a P-type differential input pair of PMOS transistors, and
a third reception buffer including a single third differential input pair of transistors, the single third differential input pair of transistors being an N-type differential input pair of NMOS transistors.

14. A memory device comprising:
a reception interface circuit including a plurality of reception buffers and a termination circuit, the reception interface circuit configured to
operate in a plurality of termination modes based on mode information stored at an internal circuit of the memory device, and
set a reception characteristic for the reception interface circuit by selecting a reception buffer from among the plurality of reception buffers based on a selected one of the plurality of termination modes, each of the plurality of reception buffers having different reception characteristics;
wherein the termination circuit includes
a first sub termination circuit configured to control an electrical connection between an input-output node and a first power supply voltage in response to a first switch control signal, and
a second sub termination circuit configured to control an electrical connection between the input-output node and a second power supply voltage in response to a second switch control signal, the second power supply voltage lower than the first power supply voltage; and
wherein the plurality of reception buffers include
a first reception buffer including a plurality of first differential input pairs of transistors, the plurality of first differential input pairs of transistors including both a first N-type differential input pair of NMOS transistors and a first P-type differential input pair of PMOS transistors,
a second reception buffer including a single second differential input pair of transistors, the single second differential input pair of transistors being a P-type differential input pair of PMOS transistors, and
a third reception buffer including a single third differential input pair of transistors, the single third differential input pair of transistors being an N-type differential input pair of NMOS transistors.

15. The memory device of claim 14, wherein the reception interface circuit further comprises:
an interface control circuit configured to
generate a buffer control signal based on the selected one of the plurality of termination modes, and
output the buffer control signal to select the reception buffer from among the plurality of reception buffers.

16. The memory device of claim 15, wherein
the interface control circuit is further configured to generate a termination control signal based on the selected one of the plurality of termination modes; and
the termination circuit is configured to
set a termination mode of the reception interface circuit to the selected one of the plurality of termination modes based on the termination control signal, and
terminate a received input signal according to the termination mode of the reception interface circuit.

17. The memory device of claim 14, wherein the plurality of termination modes include a center-tapped termination mode, an untermination mode, and a plurality of pseudo-open drain untermination modes.

18. The memory device of claim 14, wherein the reception interface circuit is further configured to set the reception characteristic for the reception interface circuit by selecting only one reception buffer from among the plurality of reception buffers based on the selected one of the plurality of termination modes.

* * * * *